US007822977B2

(12) United States Patent
Katsikas

(10) Patent No.: US 7,822,977 B2
(45) Date of Patent: Oct. 26, 2010

(54) SYSTEM FOR ELIMINATING UNAUTHORIZED ELECTRONIC MAIL

(76) Inventor: Peter L. Katsikas, 850 W. Hind Dr., Suite 102, Honolulu, HI (US) 96821

( * ) Notice: Subject to any disclaimer, the term of this patent is extended or adjusted under 35 U.S.C. 154(b) by 954 days.

(21) Appl. No.: 10/404,631

(22) Filed: Mar. 31, 2003

(65) Prior Publication Data

US 2003/0191969 A1  Oct. 9, 2003

(51) Int. Cl.
*H04L 29/06* (2006.01)
*G06F 15/16* (2006.01)
*G06F 15/173* (2006.01)

(52) U.S. Cl. ..................... 713/162; 713/154; 709/206; 709/238

(58) Field of Classification Search ................. 713/189, 713/201, 154, 162; 726/21; 709/206, 238
See application file for complete search history.

(56) References Cited

U.S. PATENT DOCUMENTS

| 5,930,479 | A | * | 7/1999 | Hall ............................ 709/238 |
| 5,931,905 | A | | 8/1999 | Hashimoto |
| 5,944,787 | A | | 8/1999 | Zoken |
| 6,052,709 | A | | 4/2000 | Paul |
| 6,073,142 | A | | 6/2000 | Geiger et al. |

(Continued)

FOREIGN PATENT DOCUMENTS

GB          2317793 A       4/1998

(Continued)

OTHER PUBLICATIONS

Mail Utilities, "ClikVU Debuts E-Mail Service to Filter Spam", press release dated Feb. 14, 2001, publ. at http://www.mailutilities.com/news/archive/32/319.html.

(Continued)

*Primary Examiner*—Nasser G Moazzami
*Assistant Examiner*—Mohammad W Reza
(74) *Attorney, Agent, or Firm*—Perkins Coie LLP

(57) ABSTRACT

A system for eliminating unauthorized email sent to a user on a network analyzes the sender address of incoming email and determines whether it is to be rejected by returning a standard "no such user" error code or accepted depending upon executing processing rules and analyzing managed lists of authorized senders. This provides an advantage over existing anti-spam filtering systems by intercepting unauthorized email before it reaches an existing email server or client. The system rejects all email unless authorized by using a standard "no such user" error code, and by redirecting the unauthorized email back to the sender or to a sender evaluation site. An ASL module captures authorized sender addresses from the user's outgoing email and other sources in order to update "authorized senders" lists. The system may employ a WBM procedure that notifies senders of rejected email to go to a separate website and register as valid senders after passing an interaction test that precludes automatic registration by a mechanical program. A destination proxy email address procedure allows subscribers to use temporary proxy addresses for receiving email expected from unknown sources and instantiates senders as authorized upon receiving the expected email to the proxy addresses. The unauthorized-email rejection component can be readily configured as a hardware or software appliance used in tandem with a conventional email server, email gateway, or firewall to an intranet, or as a software extension to an existing firewall system.

29 Claims, 18 Drawing Sheets

U.S. PATENT DOCUMENTS

| | | | |
|---|---|---|---|
| 6,101,531 | A | 8/2000 | Eggleston et al. |
| 6,112,227 | A | 8/2000 | Heiner |
| 6,195,698 | B1 | 2/2001 | Lillibridge |
| 6,199,102 | B1* | 3/2001 | Cobb .......................... 709/206 |
| 6,230,188 | B1* | 5/2001 | Marcus ....................... 709/206 |
| 6,249,805 | B1* | 6/2001 | Fleming, III ................ 709/206 |
| 6,266,692 | B1* | 7/2001 | Greenstein .................. 709/206 |
| 6,321,267 | B1* | 11/2001 | Donaldson .................. 709/229 |
| 6,366,950 | B1* | 4/2002 | Scheussler et al. .......... 709/206 |
| 6,615,348 | B1* | 9/2003 | Gibbs ......................... 713/162 |
| 6,643,687 | B1* | 11/2003 | Dickie et al. ................ 709/206 |
| 6,671,718 | B1* | 12/2003 | Meister et al. .............. 709/206 |
| 6,732,101 | B1* | 5/2004 | Cook ........................... 707/10 |
| 6,868,498 | B1 | 3/2005 | Katsikas |
| 7,092,992 | B1* | 8/2006 | Yu .............................. 709/206 |
| 2002/0120748 | A1* | 8/2002 | Schiavone et al. .......... 709/227 |
| 2005/0188045 | A1 | 8/2005 | Katsikas |

FOREIGN PATENT DOCUMENTS

| | | |
|---|---|---|
| JP | 11068828 | 9/1999 |
| WO | WO 9910817 | 3/1999 |
| WO | WO 9937066 | 7/1999 |

OTHER PUBLICATIONS

Infoworld, "SpamCon: ISPs Fight Spam From The Front Line" news article published May 25, 2001 at http://article.infoworld.com/articles/hn/xml/01/05/25/010525hnspamcon.xml.
TMDA, "TMDA History", article dated 2001-2004, refers to first release of TMDA software in Apr. 2001, publ. at http://www.tmda.net/history.html.
CVS.SOURCEFORGE.NET, "Spam Filtering ESMTP Demon", copyright notice dated 2000, publ. at http://cvs.sourceforge.net/viewscvs.py/clocc/clocc/src/donc/smtp.lisp?rev=1.4.
Official Sep. 1999 AUP (Auto Update Program) v5.0 Build 447, Product Update Release, winserver.com.
WebHabitat White Paper, John Swanson, Spam-Lion Registered Email, pp. 1-12, 2001-2002, Web Habitat, Inc.
Spam Arrest FAQ, 2003, Spam Arrest, LLC, http://spamarrest.com/faq/.
Quik Cop FAQ, 2002, Quik Internet, http://q6.quik.com/quikcop_faq.html.
Mail Wiper Website, 2002-2003, Mail Wiper Inc., http://www.mailwiper.com.
Mail Blocks Features/Benefits, 2003, Mailblocks Inc., http://about.mailblocks.com/features.html.
ChoiceMail One FAQ, 2001-2003, DigiPortal Software, Inc., http://www.digiportal.com/support/choicemail/faq.html.
Bounce Spam Mail, Albert Yale Software, dated 1997-2000.
CSM Internet Mail Scanner, CSM-USA, Inc., dated 1999.
CyberSitter AntiSpam, CyberSitter.com, distributed by Solid Oak Software, circa 1999-2000.
DL MailFilter, DeadLetter and Leem Han Cheong, Nov. 1999.
E-Mail Chomper, from Lorenzo Pasqualis, 1996-1997.
E-Mail Remover, Victor Javier, Virtual Network, Inc., Singapore, dated Mar.-Jul. 1998, and 1999.
FlameThrower, Eagle Research, Inc., 2000.
Interceptor, Grok Development Ltd., 1999-2000.
JOC E-Mail Checker, JOCSoft and Jose Olice Civit, dated 2000.
Lyris MailShield, Lyris, undated.
Quickhead-E, Danere Software Innovations, dated Mar. 2000.
Spam Attack Pro, softwiz.com, circa 1996-1997.
Spam Buster, Contact Plus Corp., dated 2000.
SpamEater, High Mountain Software, dated 1997-2000.
SpamKiller, NovaSoft, dated 1997-2000.
BrightMail, BrightMail, Inc., 2000.
Praetor, Computer Mail Services, Inc., circa 1998-1999.
"MsgTo.com Stops Spam Email," www.applesforheatlh.com, circa Nov. 19, 1999.
Needleman, R., "The Species Filter," www.RedHerring.com, Aug. 6, 1999.

* cited by examiner

Figure 11A

| | a | b | c | d | e | f | g |
|---|---|---|---|---|---|---|---|
| 1 | justforacme@spamkapu.com | joe@spamkapu.com | 12/20/2001 | relative | 720 | 1 | domain |
| 2 | financialtimes@spamkapu.com | joe@spamkapu.com | 12/20/2001 | relative | 720 | 2 | domain |
| 3 | 9874351@spamkapu.com | joe@spamkapu.com | 12/27/2001 | absolute | 720 | 5 | email |
| 4 | 456789@spamkapu.com | joe@spamkapu.com | 12/20/2001 | absolute | 720 | 1 | email |
| 5 | localpapers@spamkapu.com | joe@spamkapu.com | 1/3/2002 | relative | 0 | 2 | domain |
| 6 | amazonorder@spamkapu.com | joe@spamkapu.com | 2/15/2002 | absolute | 0 | 3 | email |

Figure 11B

| | a | b | c | d |
|---|---|---|---|---|
| 1 | justforacme@spamkapu.com | 3/31/2003 | tom | acme.com |
| 2 | financialtimes@spamkapu.com | 11/6/2002 | confirm | subscribers.com |
| 3 | financialtimes@spamkapu.com | 6/5/2002 | newsletters | subscribers.com |
| 4 | 9874351@spamkapu.com | 2/15/2002 | harry | lava.net |
| 5 | 9874351@spamkapu.com | 2/3/2003 | rich | isp.com |
| 6 | 9874351@spamkapu.com | 6/28/2002 | sally | yahoo.com |
| 7 | 9874351@spamkapu.com | 10/6/2002 | karen | hotmail.com |
| 8 | 9874351@spamkapu.com | 8/14/2002 | mike | listit.com |
| 9 | 456789@spamkapu.com | 7/14/2002 | sales | yourshoes.com |

SYSTEM FOR ELIMINATING UNAUTHORIZED ELECTRONIC MAIL

FIELD OF THE INVENTION

This invention relates to a system for eliminating unwanted email, and particularly to one in which all email must be recognized as sent by an authorized sender in order to be accepted.

BACKGROUND OF THE INVENTION

Unwanted or unauthorized email is a significant bane for users on worldwide networks, such as the current public Internet. Once a person's email address becomes known in a network system, it can easily be replicated in computerized lists and passed on electronically to an unlimited number of parties who have not been authorized or invited to send email to the user. A user's electronic mailbox can become inundated with such unauthorized email. Unauthorized or unwanted email is referred to generically in the industry by the term "spam", although the term is not intended to be associated with or to disparage the popular canned meat product sold under the trademark "Spam" by Hormel Corp. The user may have an email address with a commercial information service provider (ISP) service which limits the amount of email that can be accepted and/or stored or which charges the user by the volume received. The user may also waste a significant amount of time opening and reviewing such unwanted email. Unauthorized email may also be sent by unscrupulous persons who may enclose a virus or noxious software agent in the email which can infect the user's computer system, or which can be used as an unauthorized point of entry into a local network system that handles the user's email.

Most, if not all, of the current software to control the receipt of spam is based upon the use of identifying lists of known spam sources or senders ("spammers"). Such conventional spam control software functions on the basis of receiving all email as authorized unless a sender is identified as being on the exclusion list and the email can be filtered out. This approach is only as good as the identifying list and cannot guarantee that the user will not receive spam. Spammer lists require frequent updating and must be distributed in a timely manner to all subscribers to the spam control software or service. Sophisticated spammers frequently change their source Internet address, and can defeat attempts to keep exclusion lists current. They can also route the unwanted email through the Internet servers of other parties so as to disguise the source of the emails through innocuous or popularly recognized names. A user's email address may also become known to large numbers of individuals in public chat rooms or on public bulletin boards. Unwanted email sent by individuals are not tracked on spammer lists, because the sending of email by individuals is technically not spamming.

SUMMARY OF THE INVENTION

Accordingly, it is a principal object of the present invention to provide a spam control system that cannot be defeated by spammers who frequently change their source addresses or disguise themselves by routing email through other servers, or by individuals who send email that are not invited or authorized by the user. It is a particular object of the invention that the system of the invention rejects all email as unauthorized unless the sender is recognized as being on the user's acceptance list.

In accordance with the present invention, a system for eliminating unauthorized email sent to a user on a network comprises:

(a) an email client for allowing the user to receive email sent on the network addressed to a unique email address of the user, (b) an email-receiving server connected between the network and the email client for receiving email addressed to the unique email address of the user, (c) an unauthorized-email rejection component having an authorized senders list (ASL) module which maintains email addresses of senders authorized to send email to the user, wherein the unauthorized-email rejection component is operable with the email-receiving server for intercepting and rejecting any incoming email addressed to the email address of the user.

In a preferred embodiment, the system's ASL module includes an ASL rules database for storing ASL rules lists of authorized sender addresses and associated processing rules for respective subscribers of the system, a spam processor module for processing the ASL rule list for matches, and an ASL manager for creating, maintaining, and updating the ASL rule lists. A redirector module rejects email based on the outcome of the spam processor module processing the sender's address against the ASL rule list. Email rejected by the redirector module is redirected to a web-based messaging (WBM) website and a message is sent notifying the sender to visit the WBM site and confirm that the sender is a legitimate sender of email to the intended recipient. If the sender logs on to confirm their status, the WBM component on the site executes an interaction procedure which can only be performed by a human, in order to ensure that the confirmation procedure is not performed by a mechanical program. The ASL manager maintains the ASL rule lists based upon sender address data collected from various sources and analyses of various email usage factors, including sent email, received email, contact lists maintained by the user, user preference inputs, third party programs, etc.

The invention also encompasses associated methods of performing the above functions, as well as related software components which enable these functions to be performed.

Other objects, features, and advantages of the present invention will be described in further detail below, with reference to the following drawings:

BRIEF DESCRIPTION OF DRAWINGS

FIGS. 11A and 11B illustrate examples of the implementation of processing rules and results associated with the email proxy processing subsystem.

DETAILED DESCRIPTION OF INVENTION

In contrast to the known approaches of existing spam control methods of accepting all email unless listed on an exclusion list as unauthorized, the fundamental principle of the present invention is to reject all email unless the rules processing returns a favorable response. In this manner, it is possible to filter out email that comes from unrecognized spammers as well as individuals who send email that is uninvited by the user. Unlike the known email filtering systems, the present invention does not attempt to filter out the unwanted email after it has been accepted. Rather, it outright rejects the email at the earliest entry level by returning a server-level "no such user" error message to the device that is transmitting the sender's email. Thus, the invention operates on the premise that all email will be preprocessed according to pre-set rules before the validity of the recipient's (user) email address will even be accepted as correct. This provides an inherently powerful and 100% effective spam control solution in an environment where spammers can instantaneously change their source address or apparent identity and individuals in public areas can obtain email addresses of other users and send them unwanted email.

The following is a detailed description of one preferred embodiment of a system for implementing the invention concept. In this embodiment, the spam control system intelligently formulates the "authorized senders" rules list based upon user-defined actions previously stored in the email proxy preprocessor, an ongoing analysis of the user's email usage, such as to whom and with what frequency sent email is addressed to other users, and through the gathering of high-level user contact data, such as a user's known contacts and associates identified on other lists or files maintained by the user which indicate persons considered as authorized. The "authorized senders" rules list may also be updated and manipulated by the user at any time to add or remove authorized senders and/or associated processing rules. While this specific implementation is used, and certain components are provided and configured to be interoperable in the described ways, it is to be understood that the full scope of the invention is deemed to encompass many other suitable modifications and variations to the described guiding principles of the invention.

Figure 1A:
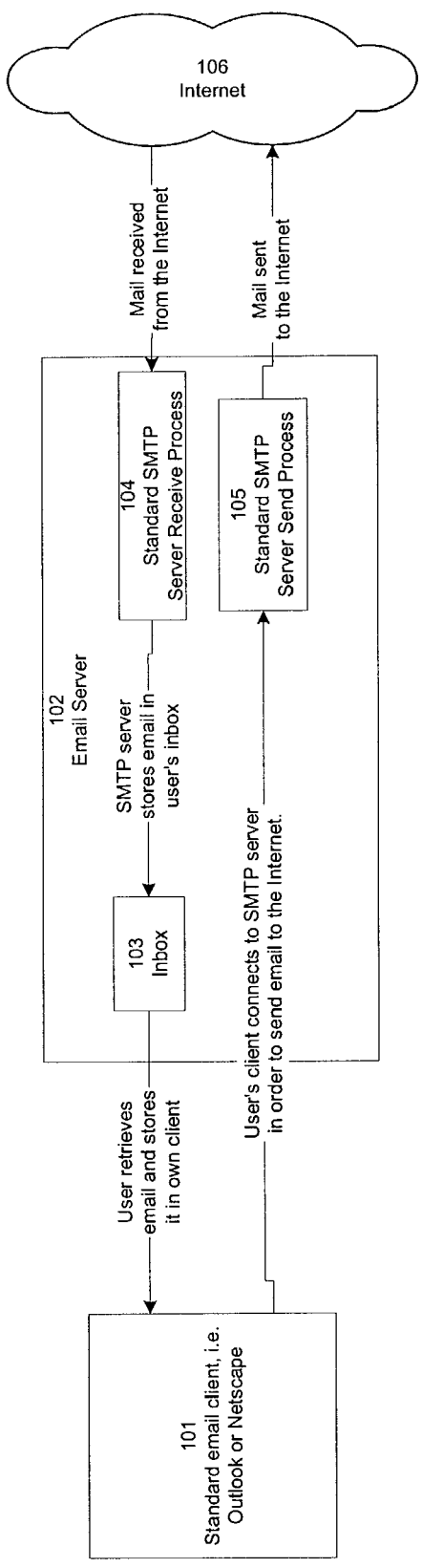
FIG. 1A is a block diagram illustrating a standard Internet email system using the conventional method for filtering email from spammers (Prior Art), as compared to FIG. 1B which shows a conceptual overview of a system in accordance with the present invention.

FIG. 1A is a block diagram of a standard email system for sending and receiving email on the Internet and is used to explain the conventional method for filtering out email from spammers. The system follows a standard industry protocol for handling email on the Internet, referred to as SMTP. Users typically subscribe with a chosen ISP for Internet access and related services, including email services. The users access the Internet through the ISP using a dialup or high-speed line connection and a standard browser. The browser includes or functions with a standard email client 101, such as the Outlook TM email client distributed by Microsoft Corp., headquartered in Bellevue, Wash., or the Netscape™ email client used by AOL Online, Fairfield, Va. The ISP operates at a website address corresponding to its domain name which is addressable by users on the Internet. The ISP's service functions are performed for a large number of subscribers through one or more servers. Typically, an email server 102 is used to handle the email service functions. Email sent to the ISP from the Internet is received at SMTP Server 104, where various administrative functions are performed, such as checking whether the addressee is an authorized subscriber of the ISP, then the email is placed in a storage space reserved for that user, referred to as Inbox 103. When users connect to the ISP, they can retrieve their email and store it with their own email client (on their own computer). Users can send email by composing it locally at their email client, then uploading it to the SMTP Server 105 at the ISP, which then routes it to the recipient's email address on the Internet.

Conventional anti-spam control can be implemented with the SMTP Server and/or at the email client. Many ISPs implement an exclusion list of known spammers at the SMTP Server. In addition, they commonly allow a user to filter out unwanted email from certain senders known to the user. For example, the user's email client may have a filtering function that allows the user to input unwanted sender email addresses to the SMTP Server so that email received by the SMTP Server can be filtered out before being put into the user's Inbox. Further, independent software vendors sell sophisticated email handling programs that work with the user's email client. For example, some handling program have functions for categorizing received email into topical file folders, and email from unrecognized senders may be put into a "Miscellaneous" or "Unrecognized" file folder.

Figure 1B:
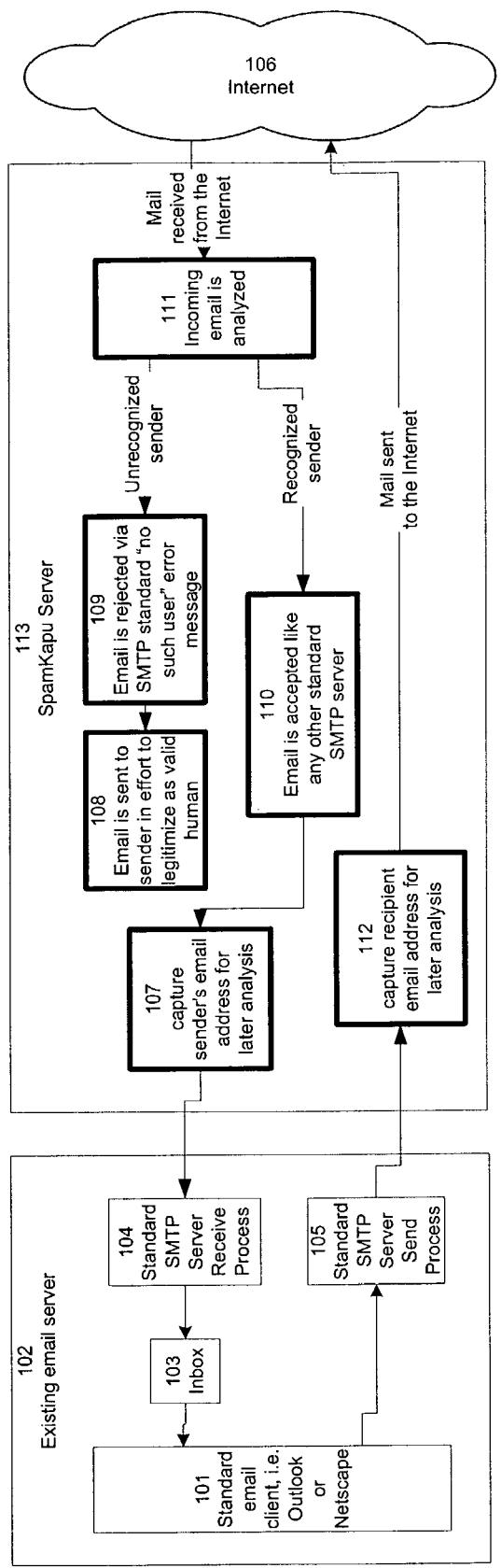

In FIG. 1B, a conceptual overview of a system in accordance with the present invention is shown. As before, the standard email client 101 is connected to an email server 102 for sending and receiving email to and from the Internet via SMTP Server 104 and Inbox 103. However, in this modified operation, the present invention provides for an unauthorized-email rejection component 113 upstream of the existing email server which intercepts and rejects email before it is accepted by the email server. In the rejection component 113, an Authorized Sender List (ASL) Manager captures recipient email addresses from email sent by the user, as shown at block 112, and also captures sender email addresses from email sent to the user, as shown at block 107. The ASL Manager analyzes the captured sender email addresses and recipient email addresses and employs certain pre-defined rules (described in further detail below) to add or remove email addresses from the "authorized senders" list, referred to as the ASL Rule List or Database. The ASL Rule List is used by the SPAMKAPU Server 113 to accept only email from senders that favorably pass the ASL processing and subsequently relays the email to the pre-existing standard SMTP email server 104 while rejecting all other email with a "not such user" error code, as indicated at block 109.

Figure 2:
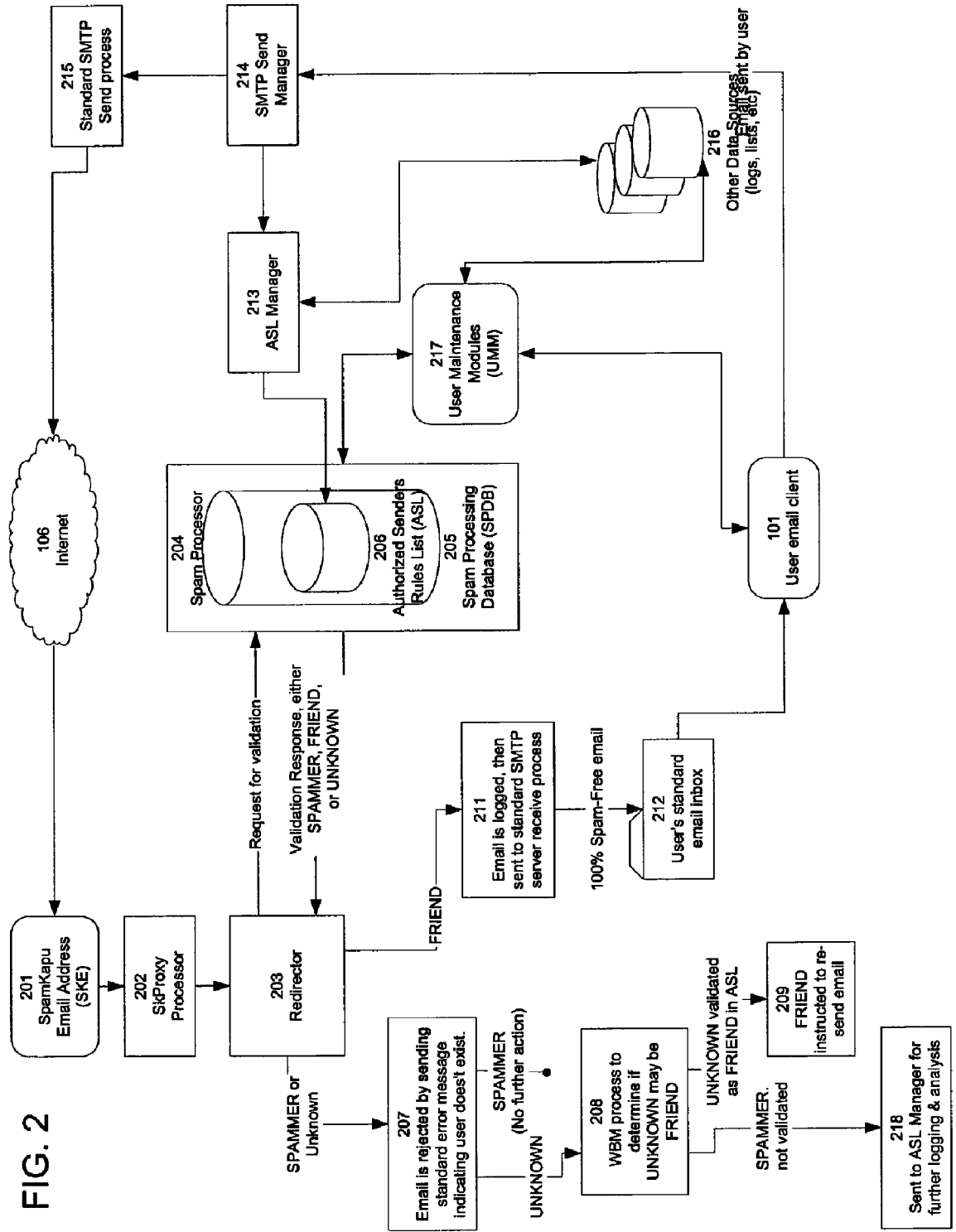
FIG. 2 is a process flow diagram for a preferred embodiment of the anti-spam system of the present invention.

Referring to FIG. 2, the process flow for the operational steps of the anti-spam system of the present invention will now be described. Certain terms used in the description are defined below:

SPAMKAPU: An example of the spam control system of the invention.

SUBSCRIBER: A person subscribing to an ISP email service that is using the spam control system of the invention.

FRIEND: An email-sending source that is authorized by the spam control system to send email to the SUBSCRIBER.

SPAMMER: An email-sending source that is not authorized to send email to the SUBSCRIBER, which is commonly understood to be an unknown or unauthorized party that is using a manual or computerized email list mailing program to send large volumes of emails repetitively through the Internet.

UNKNOWN: An email sending source that has not yet been identified as either a SPAMMER or a CONTACT.

Email sent from the Internet (106) is sent to the email address of the ISP for the SUBSCRIBER, referred to in block 201 as the SpamKapu Email Address (SKE). Received email must first pass through the skproxy preprocessor 202. The skProxy preprocessor examines the "to:" email address against a table of proxy addresses and if there is a match appropriately processes the email before passing it to the Redirector 203. The Redirector 203 sends a request for validation for the email from the Spam Processor 204 which maintains the Spam Processing Database (SPDB) 205, including the Authorized Senders Rules List (ASL) 206. The SPDB Database and ASL Rules List are the heart of SPAMKAPU, as they contain the processing rules and lists of persons authorized to send email to the respective SUBSCRIBERS of the system. The Spam Processor 204 sends a response, either that the sender's address on the email is not authorized on the ASL List, i.e., is a SPAMMER, or is authorized on the ASL rules list, i.e., is a FRIEND, or is not present at all on the ASL rules list, i.e. is a UNKNOWN. If the response is that it is a SPAMMER, the Redirector 203 rejects the email, as shown at block 207, such as by sending a standard error message to the sending server that the user as addressed does not exist.

As a refinement to the system, a Web-Based Messenger (WBM) process at block 208 may be set up to provide a corrective procedure in the event that the rejected email is from someone not yet listed on the ASL list and therefore an UNKNOWN. The unauthorized email may actually be from a person who has not been previously processed in the anti-spam system but who has a legitimate reason to reach the SUBSCRIBER. The WBM process 208 is set up as part of the spam control system to which the rejected email is redirected. The WBM process then sends an email to the email sender, who is now treated as an UNKNOWN. For example, the email message may read:

"An email sent by you to SUBSCRIBER's address was redirected to this site as being sent from an unrecognized sender address which may be a source of spam email. If you would like to confirm yourself as a person with legitimate reason to reach the SUBSCRIBER, please visit the WBM site and confirm your status as a FRIEND."

The WBM may have a separate web site address for interactions with UNKNOWNS,. When an UNKNOWN receives the error response email, if they are a legitimate FRIEND for the SUBSCRIBER, they may elect to go to the WBM site to confirm their status as a legitimate FRIEND. If done before the expiration date, the WBM process will add an entry into the ASL rules list so that the now validated FRIEND may re-send the previous email and send future emails without error at shown in block 209. If the SUSPECT does not respond, this fact is also sent to the ASL Manager for further analysis. The extra confirmation step effectively eliminates SPAMMERS since they use automated programs to send out batch email and typically will not take human response time to log on to the WBM site to confirm their legitimate status.

If the Spam Processor sends a validation response that the sender is a FRIEND, then the Redirector 203 passes the email to the designated existing SMTP server 211 which processes the email accordance with existing Internet standards (RFC821). The user can now collect their email their standard Inbox 212 (using standard Internet protocols such as POP3 or IMAP4) through the user email client 101 on their computer. Their email is 100% spam-free, since all email from senders not recognized by the system as authorized has been rejected.

Users send email composed on and sent from the email client 101 via standard SMTP protocols to the ISP's email server. The ISP's SMTP server is responsible for providing users with email addresses within the system, and sending users' email to the recipients' email addresses on the Internet 103. In the SPAMKAPU invention system, an SMTP Send Manager 214 is provided to intervene in the usual send email process. The SMTP Send Manager 212 copies header information from all outgoing email and sends the data to the ASL Manager 213, then sends the email on to the ISP's existing SMTP server which in-turn sends the mail to its intended destination as shown in block 215. The ASL Manager 213 performs one of the key functions in the invention system. It analyzes the header data from sent email and data from other data sources 216 maintained by the ISP email server system, such as email logs and user-supplied lists. On the basis of its analysis routines (to be described in further detail below), the ASL Manager 211 checks, populates, and updates the SPDB Database and ASL Rule List with the email addresses and other data on senders authorized to send email to the SUBSCRIBERS. The SPAMKAPU system also includes User Maintenance Modules (UMM) 217 which allows the user to interact with and upload user information to SPAMKAPU for further customization of SPAMKAPU's email operations for the user.

Figure 3A:
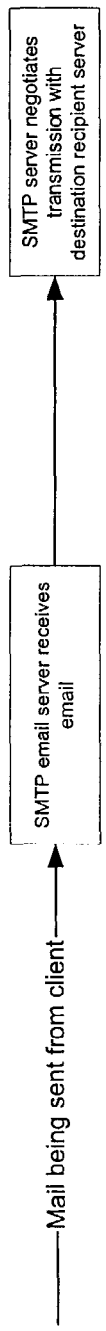
FIG. 3A is a block diagram illustrating a standard SMTP send email process (Prior Art), as compared to FIG. 3B which shows a modified send email process used in the present invention.
Figure 3B:
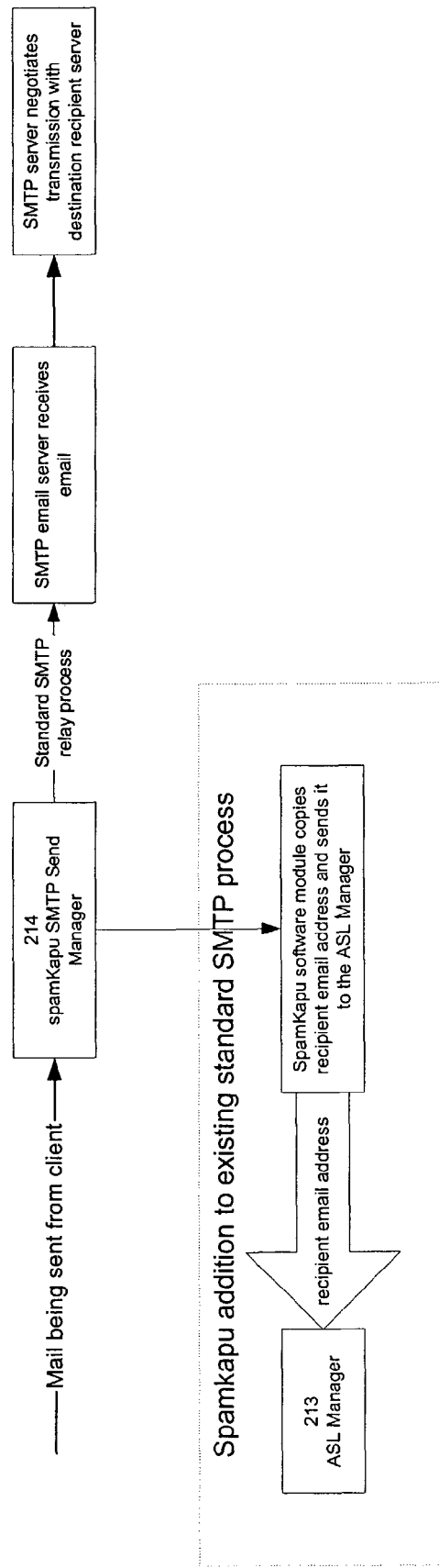

Referring to FIGS. 3A and 3B, a standard SMTP send email process (Prior Art) is shown compared to a modified send email process used in the present invention. In the standard send email process, in FIG. 3A, email sent from the user's email client to the ISP's email server may be pre-processed, such as checking for correct syntax, alias expansion, etc., and to identify the list of recipient email addresses (could be 1 or more). The server email manager gets each recipient email address in turn and attempts to establish a connection to the destination SMTP server and verify if the recipient email address is proper. If negotiation is unsuccessful, an error message is returned to the sending SMTP server. If negotiation is successful, the sending server sends the message body to the destination server and performs a proper "close connection" operation. In the modified send email process of the invention, in FIG. 3B, the email sent from the client is pre-processed by the SPAMKAPU SMTP Send manager 214 which copies the all recipient email address(es) including but not limited to the "TO: CC: and BCC:" addresses and sends the data to the ASL Manager 213. The SPAMKAPU SMTP Send Manager then passes the email to the existing ISP email server for transmission to the actual destination(s). On the assumption that the SUBSCRIBER authorizes email to be received from any person the SUBSCRIBER has sent email to, the proper email addresses of persons to whom the SUBSCRIBER has sent email are added to the ASL list of persons authorized to send email to the SUBSCRIBER. The sent email data can be used in further analyses by the ASL Manager, e.g., to upgrade a person's authorized status from temporary to permanent if more than a threshold number of email is sent by the SUBSCRIBER to the same person.

Figure 4A:
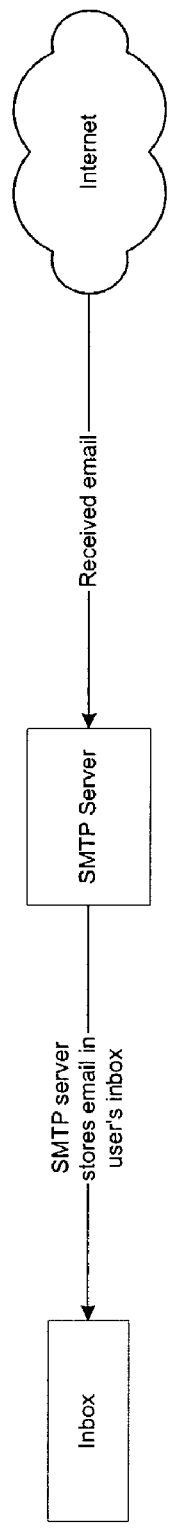
FIG. 4A is a block diagram illustrating a standard SMTP receive email process (Prior Art), as compared to FIG. 4B which shows a modified receive email process used in the present invention.
Figure 4B:
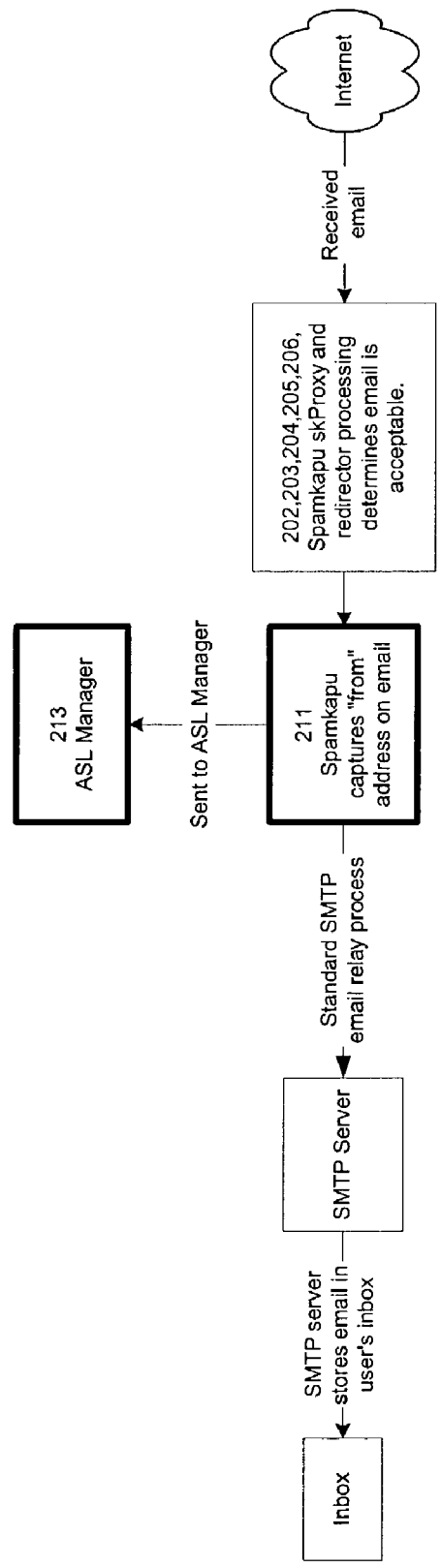

Referring to FIGS. 4A and 4B, a standard SMTP receive email process (Prior Art) is shown compared to a modified receive email process used in the present invention. In the standard receive email process, in FIG. 4A, email is received by the SMTP server from sender sources on the Internet and the server stores the email in the user's Inbox. In the modified receive email process of the invention, in FIG. 4B, the received email is subjected to processing by the skproxy and redirector as shown in blocks 202 through 206 to determine the nature of the sender's address (FRIEND, SPAMMER, or UNKNOWN). Even though the sender is already on the ASL authorized persons list, the received email data can be used in further analyses by the ASL Manager, e.g., to upgrade a person's authorized status from temporary to permanent if email from that person is received on an ongoing basis and has not been changed by the user. The SMTP receive email process then sends the email to the existing SMTP server via standard (rfc821) relay protocols for normal processing.

Figure 5:
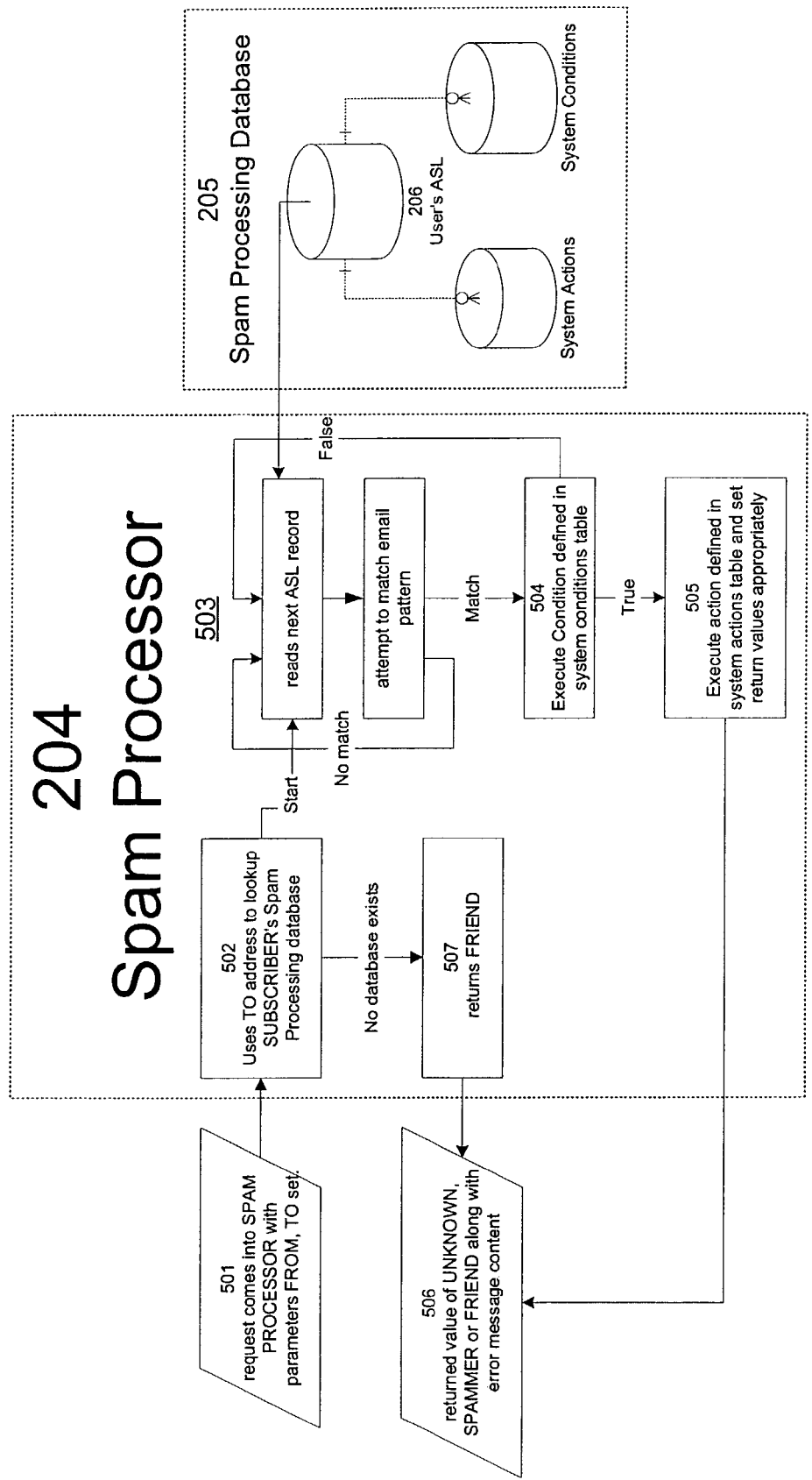
FIG. 5 is a process flow diagram illustrating the operation of an anti-spam processing routine in the preferred embodiment of the invention.

In FIG. 5, a process flow diagram illustrates the operation of the Spam Processor 203. At block 501, a request from the calling routine, here Redirector 203, seeks validation whether a received email is from an authorized sender. The request identifies the parameters who the email is FROM and who it is sent TO. The Spam Processor 204 uses the TO address to lookup that user's ASL list 206 in the SPDB Database 205, as indicated at block 502. The lookup procedure follows a loop 503 of reading the next ASL record on the user's ASL list, checking for a match to the email FROM address (authorized person), reading the next record if there is no match of the current record, executing the match condition by issuing a TRUE value if found, otherwise returning for the next record, as indicated at block 504. At block 505, if a TRUE VALUE is issued, then at block 505 the action is taken of executing the processes as defined in the Spam Processing Database or SPDB for this particular FROM/TO combination. Examples of processes include setting the output value to either FRIEND, SPAMMER, or UNKNOWN but also may include the execution of $3^{rd}$ party software that may determine a FROM source is blacklisted or even determining that the email contains viruses. At block 506, the returned value is sent as a message to the calling routine, i.e., the Redirector 203. If the returned value is UNKNOWN, a standard error message is included. As a default option, if no ASL list is found for the user, the system returns the value FRIEND, as indicated at block 507, in order to allow the email to be accepted as a temporary condition until an ASL list can be established for that user. The request processing routine can be implemented using industry standard PERL programming syntax and incorporating a PERL interpreter to execute the processing rules.

Figure 6:
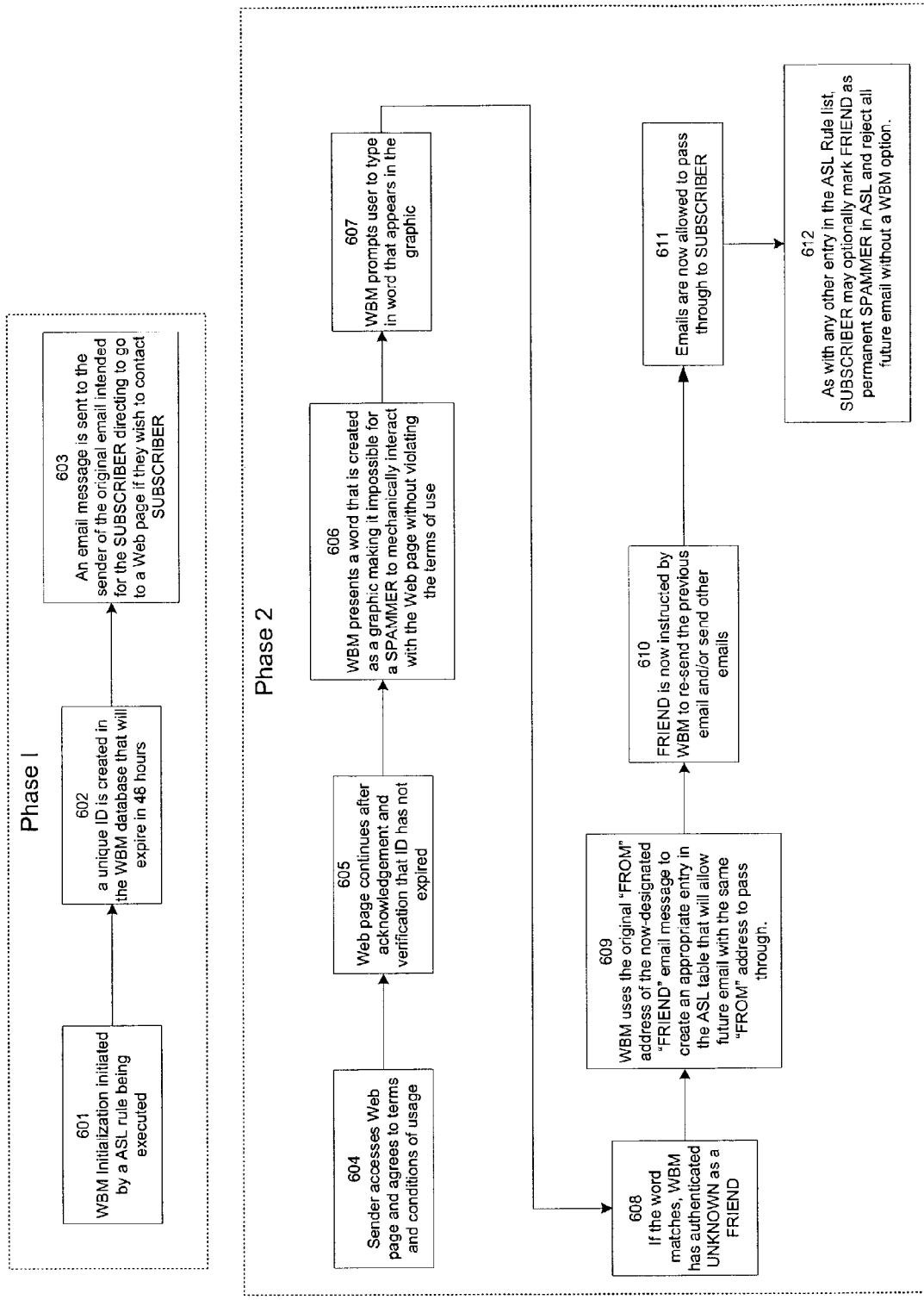
FIG. 6 is a process flow diagram illustrating the detailed operation of a Web-Based Messenger (WBM) routine for handling email initially rejected by the anti-spam control.

In FIG. 6, a process flow diagram illustrates the detailed operation of the Web-Based Messenger (WBM) routine for handling email rejected by the Redirector 202 (see FIG. 2). Preferably, the WBM process is implemented via interaction with a rejected sender at a separate Web site address. In Phase 1, corresponding to step 204 in FIG. 2, the WBM process is initialized at block 601 by the ASL rule returning a value for rejecting an email as sent from an UNKNOWN by the Redirector 203. At block 602, a unique ID number is assigned to the UNKNOWN sender's email address in the WBM database and a given expiration date is set, e.g., 48 hours. At block 603, a return email is sent back to the sender's email address in order to notify the UNKNOWN to go to the WBM web page if they wish to follow through with contacting the SUBSCRIBER. The WBM then waits for the UNKNOWN to go to the WBM site to complete the process, referred to as Phase 2. At block 604, the UNKNOWN accesses the WBM web site and agrees to the displayed terms and conditions of usage. At block 605, the WBM process verifies that the time for response for the email corresponding to the ID number has not expired. The WBM then follows a test procedure to ensure that the responding UNKNOWN is not being implemented by a mechanical program. For example, at block 606, a word or question stylized in non-standard font can be displayed as a graphic image, and at block 607 the SPAMMER is prompted to type the word or answer the question that appears in the graphic. A mechanical program would not be able to read a graphic image of a word in unrecognizable font or would not be able to answer the question. At block 608, if the WBM process determines that a correct word or answer has been typed, the UNKNOWN status is upgraded to FRIEND on the user's ASL Rule list. At block 609, the WBM process notifies the FRIEND that he/she may re-send their original email and/or other email to the SUBSCRIBER. At block 612, if the SUBSCRIBER determines that the email is from someone whose email should be rejected without a WBM error reply option, the SUBSCRIBER may optionally downgrade the status permanently to SPAMMER through the UMM 214.

Figure 7A:
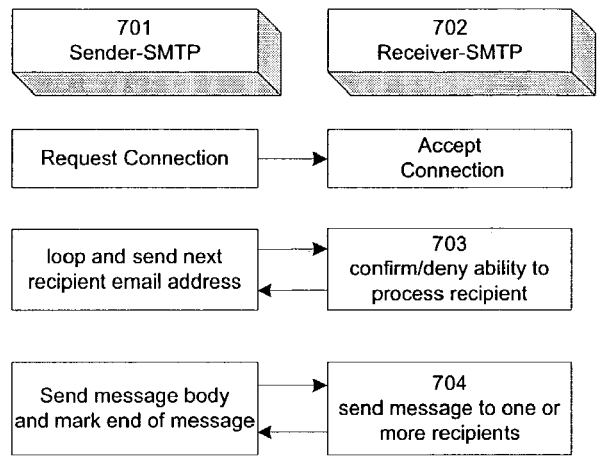
FIG. 7A is a block diagram illustrating a standard SMTP send-receive email handling process (Prior Art), as compared to FIG. 7B which shows a modified Redirector process for handling received email.
Figure 7B:
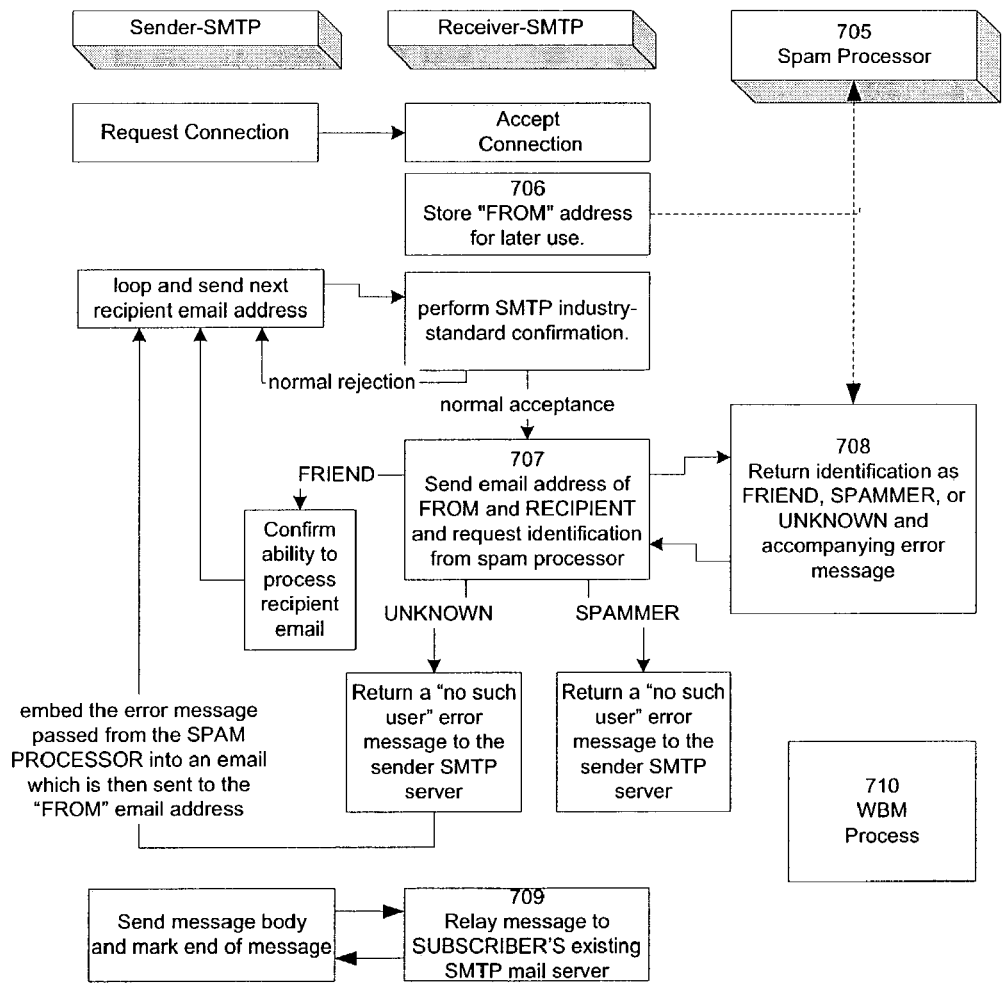

Referring to FIG. 7A, a block diagram illustrates a standard SMTP send-receive email handling process (Prior Art), as compared to FIG. 7B which shows a modified Redirector process for handling received email. In the standard process, the Sender-SMTP 701 requests connection to the Receiver-SMTP 702, which accepts the connection if available. The Sender SMTP then performs the task in its Send Email loop of sending the recipient's email address. At block 703, the Receiver-SMTP confirms or denies whether the recipient exists or whether it has authority to process email for this user. If confirmed, the Sender-SMTP sends the message body and marks the end of the message. At block 704, the Receiver-SMTP receives the message body and sends it to the email box of the recipient (or recipients if the message is sent to more than one recipient at that SMTP server address.

In FIG. 7B, the Sender-SMTP 701 and Receiver-SMTP 702 perform their usual establishing of a connection and check for valid recipient e-mail address. However, in this modified process implemented in conjunction with the Spam Processor 705, the sender's email header information, including the FROM address is stored by the Spam Processor for later use, as indicated at block 706. At block 707, the sender's FROM address and the recipient's TO address are sent to the Spam Processor 705, by a request for validation by the Redirector as described previously. At block 708, after checking the recipient's ASL Rules list to determine the status of the sender, the Spam Processor can return a response of FRIEND or a response of SPAMMER or UNKNOWN with an accompanying error message. If the response is FRIEND, an output is sent to the Sender-SMTP confirming that the email can be received, and the email is sent to the Receiver-SMTP as usual. At block 709, the Receiver-SMTP relays the email to the recipient's email server for standard inbox processing and, if desired, can include a message noting that the sender was identified on the ASL list as a FRIEND. If the response is SPAMMER, then an error message is returned to the Sender-SMTP that the recipient does not exist or the Recipient-SMTP is not authorized to accept the email. If the response is UNKNOWN, the Receiver-SMTP may send the email through the WBM process, as described previously (indicated at block 710), if the response from the Spam Processor indicates that the status of the sender is an UNKNOWN sender (as opposed to having the confirmed status of SPAMMER).

Figure 8A:
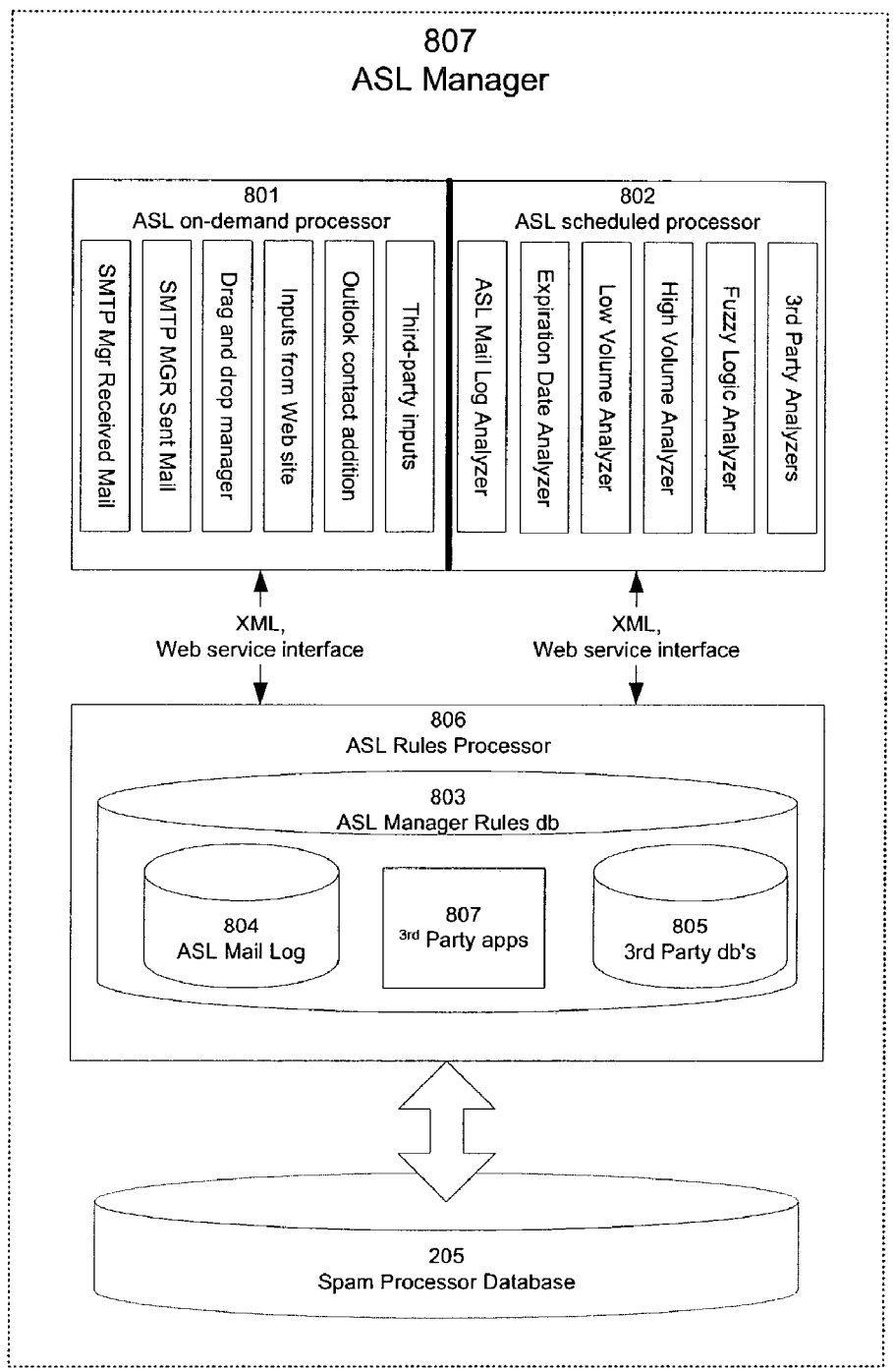
FIGS. 8A to 8D are schematic diagrams illustrating the structure and operation of the ASL Manager in the preferred embodiment of the spam control system.

In FIG. 8A, a schematic diagram illustrates the structure and operation of the ASL Manager, previously described as component 211 with respect to FIG. 2. The ASL Manager preferably is structured to have an ASL On-Demand Processor 801 and an ASL Scheduler Processor 802, both of which utilize industry standard XML and Web service protocols to interact with an ASL Rules Processor 806, which also exchanges data with the Spam Processor Database (SPDB) 205. Email addresses sent to and received from the SMTP Send Manager 214 and SMTP Receive Manager 211 are processed by the ASL On-Demand Processor 801 which executes the appropriate rules in conjunction with the ASL Rules Processor 803. Content from a variety of other sources, including compatible third party plug-ins, can also be processed to create, populate, and update the ASL lists stored in the SPDB 205. For example, content may be received from a "Drag and Drop Manager" for conveniently handling user address inputs while working with the email client, user address inputs from Web sites while working with an associated browser, addresses added by the user to a desktop contact manager, such as the Microsoft Outlook TM Address Book, or other contact lists, and other address inputs generated by third party software that can operate with the user's client programs.

The ASL Scheduler Processor 802 is used to process tasks on a scheduled basis for various analysis and maintenance functions. This allows a very rich examination of the SUBSCRIBER's ASL list, mail log, and other data files, to continually refine the "authorized senders" list for accuracy and relevance. For example, the processor functions can include: an ASL Mail Log Analyzer for analyzing the ASL Mail Log database 804 of the SUBSCRIBER's received and sent emails; an Expiration Date Analyzer for setting and enforcing expiration dates for authorized senders to be re-authorized; a Low Volume Analyzer for downgrading or eliminating the authorization status of senders with whom the SUBSCRIBER communicates very infrequently; a High Volume Analyzer for upgrading or permanently marking the authorization status of senders with whom the SUBSCRIBER communicates very frequently; a Fuzzy Logic Analyzer for making qualitative decisions as to FRIEND or SPAMMER status based on a variety of factors; and other Third Party Analyzers for analyzing data generated by third party plug-ins and programs to refine the ASL list.

The ASL Rules Processor 806 contains the rules (in an ASL Manager Rules Database 803) that determine how to add, update or modify the ASL Lists maintained in the SPDB Database 205. The Rules Processor can have an architecture that readily accepts and interoperates with third party databases 805 and applications programs 807 in order to harness the collective power of developers in the network communications industry to continually improve and extend the SPAMKAPU system's feature set. The ultimate result of this architecture is to enable the creation of a very richly detailed ASL database which goes beyond even the total elimination of spam email into other or future needs of users for the dynamic and intelligent handling of email.

Figure 8B:
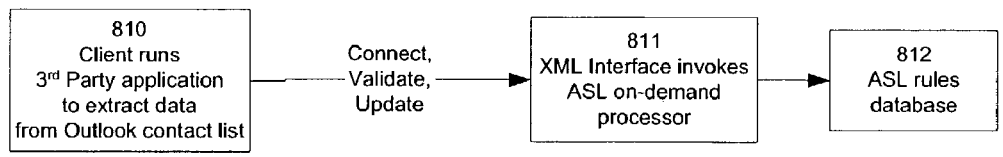
Figure 8C:
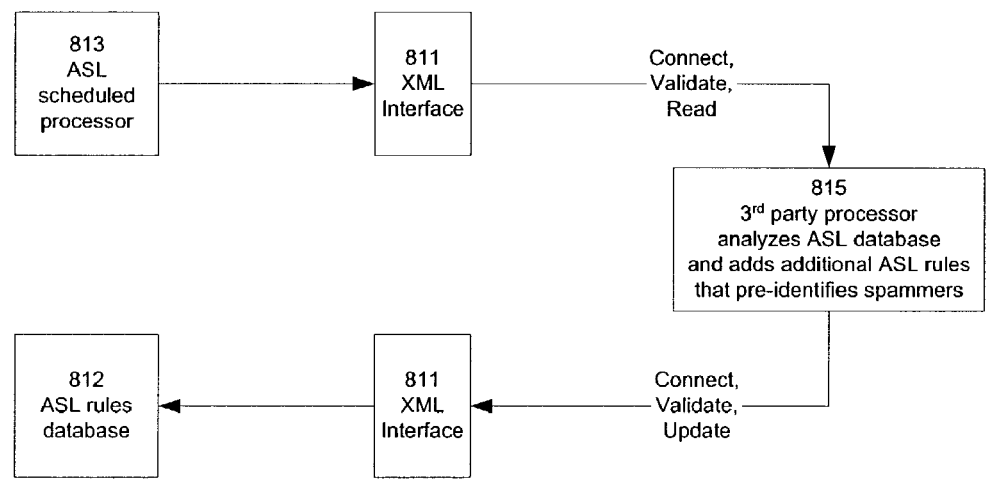
Figure 8D:
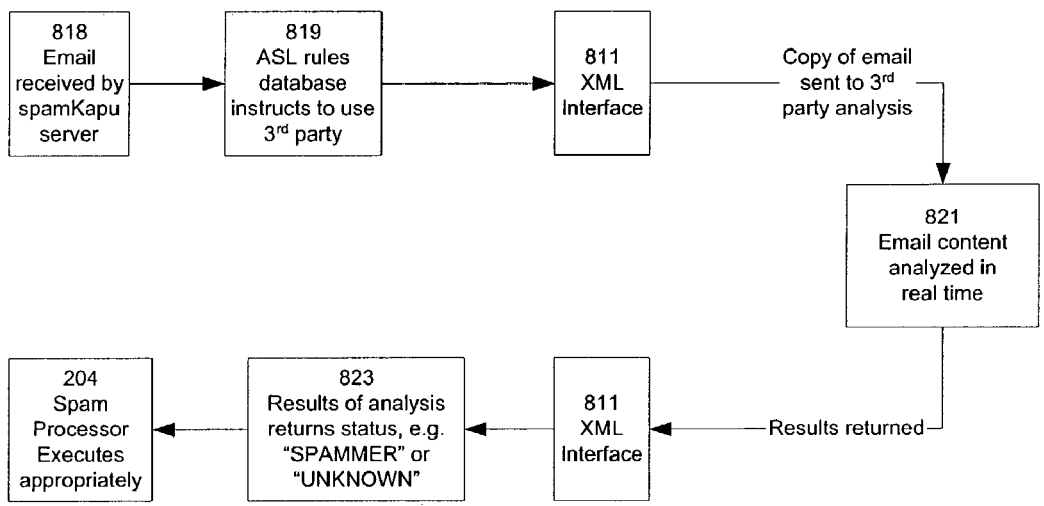

FIGS. 8B, 8C, 8D, illustrate various configurations where the invention interfaces with $3^{rd}$ party services and software. FIG. 8B illustrates a specific example of how the on-demand processor operates. In this case, $3^{rd}$ party software installed on the subscriber's client computer 810 gathers all email addresses stored in an application such as Microsoft Outlook, then connects to the spamKapu server using an XML interface 811 and uploads the contacts into the ASL Rules database 812, marking them as "Friend".

FIG. 8C illustrates a specific example of how the ASL Scheduled Processor invokes an XML interface 811 to connect to a remote $3^{rd}$ party service 815 to perform a detailed analysis of the ASL Rules database. Updates to the database are transmitted back by XML interface 815 to update the ASL Rules database 812.

FIG. 8D illustrates a specific example of how the ASL Rules database can utilize a $3^{rd}$ party to analyze email in real-time. As email is received by the SpamKapu server 818 an ASL Rule is invoked to used a $3^{rd}$ party 819 and uses an XML interface 811 to connect to a $3^{rd}$ party real-time email analysis service 821 which may employ sophisticated pattern matching analysis, for example. The service 821 uses an XML interface 811 to return a result of SPAMMER, FRIEND, or UNKNOWN 823 which is then further processed by the SPAM PROCESSOR 204.

Figure 9:
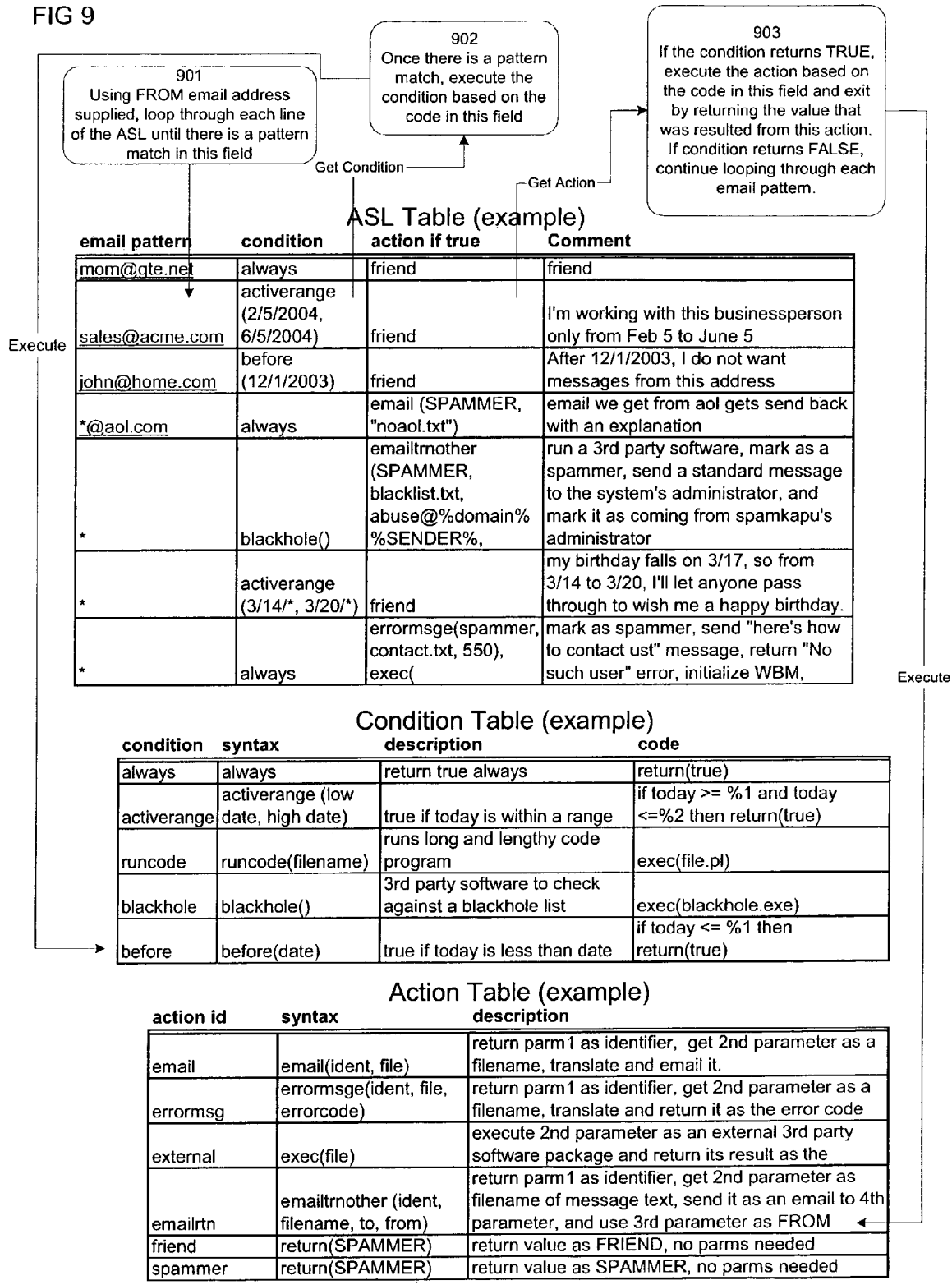
FIG. 9 illustrates a detailed implementation of examples of processing of email send/receive and user contact data into specific forms of actions taken by the ASL Manager.

In FIG. 9, a detailed implementation is illustrated of examples of processing of email send/receive and user contact data into specific forms of actions taken by the ASL Manager. The basic process flow consists of: Step 901 of looping through each line of an ASL rules list (called a Table) comparing the FROM address captured from an incoming email for a match; Step 902 of determining whatever condition or status flag has been set for the matched entry, then executing the corresponding condition rule as maintained on the Condition Table, resulting in return of a Return Value; and Step 903, based on the Return Value, executing the corresponding action rule as maintained on the Action Table, and exiting with a Final Return Value from this action. To follow one example through this process flow, Step 901 finds a FROM match of the sender address john@home.com, Step 902 notes the expiration date condition "before Dec. 1, 2003" and executes the "before" condition on the Condition Table to return a value of "True" if today's date is less than the indicated expiration date, and Step 903 notes that the sender status action (if condition is True) is "friend" and executes the "friend" action on the Action Table to return a Final Return Value of FRIEND (no parameters needed) as the validation response of the Spam Processor.

The specific programming syntax or execution logic of the ASL Manager rules processing may be varied in any suitable manner depending on the developer of the Spam Processor application. The following examples of some options for ASL Manager actions illustrate a wide range of approaches that may be used:

MATCHING AN EMAIL ADDRESS OR ADDRESS PATTERN:
(a) Default: exact match
(b) A specific email address: john@company.com
(c) UNIX Standard wildcard matching:
  *.microsoft.com=anything from "Microsoft.com"
  *microsoft*=anything with microsoft in it
  *.mil=any email from the military
(d) Matching any known "blackhole list" by using a %BLACKHOLE% symbol.
USING A CONDITIONAL AND PARAMETERS TO EXECUTE IF THE MATCH IS TRUE
USING A SECONDARY ACTION AND PARAMETERS TO PERFORM IF THE CONDITIONAL IS TRUE.
USING THE LAST DATE THE SUBSCRIBER SENT EMAIL TO THIS ADDRESS USING THE LAST DATE THIS ADDRESS SENT EMAIL TO THE SUBSCRIBER
USING DATE THE RECORD WAS CREATED
EXAMPLES OF CONDITIONALS THAT CAN BE USED
(a) Expiration dates: use a given address until Feb. 12, 2004
(b) Date ranges: use a given address from Apr. 1, 2004 to May 2, 2004
(c) Specific recurring times: first week of every month but no other time, e.g., newsletter@magazine.com acceptable during 1$^{st}$ week of each month.
(d) A link to external software designed to allow for additional user-defined criteria; this allows for third party applications EXAMPLES OF MESSAGES THAT MAY BE INVOKED BY A GIVEN SECONDARY ACTION
(a) Standard "error"
(b) Custom with variable substitution in the message body, e.g.:
  %username% is substituted with the sender's email address
  %subid% is the ID code of the subscriber
  %date% is today's date
(c) "hello %username% you have been identified as spam, go to http://www.spamkapu.con/subscriber=%subid% and if you're really human we'll let you in.
(d) Custom text: "All email addresses from America Online are unconditionally rejected"
(e) Send a given message in the error response.
(f) Send a given message as an email.
(g) Open a file and email its contents
(h) Open a file and send its contents as an error reponse.
(i) Set the sender's status to SPAMMER or FRIEND
(j) Create a unique ID that will expire after a short time period (24-48 hrs). This id can be used by the SUSPECT to access the WBM and become a CONTACT.
(k) Give SMTP default error message
(l) Link and execute external software designed to allow for additional user-defined actions; this allows for third party applications.

Figure 10A:
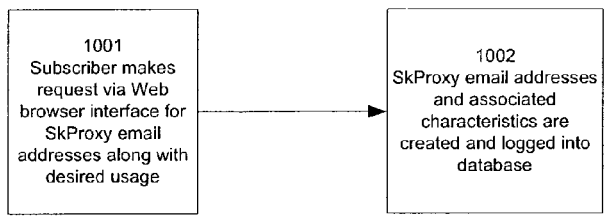
FIGS. 10A to 10C are schematic diagrams illustrating the structure and operation of the invention's email proxy address subsystem processing in the preferred embodiment of the spam control system.
Figure 10B:
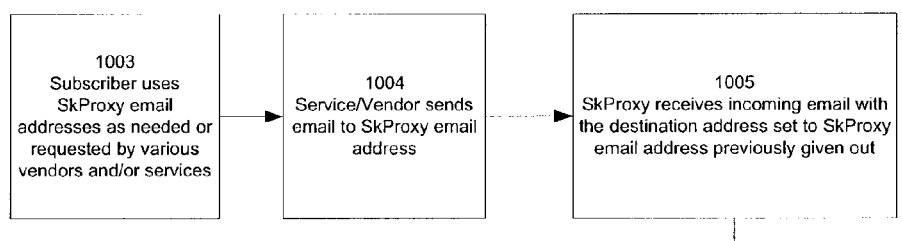

In FIGS. 10A and 10B, a schematic diagram illustrates the structure and operation of the SkProxy email preprocessor. The preprocessor simplifies the method by which users can manage their ASL rules list in situations where the user may wish to receive email from source whose "FROM:" email address is not known. Examples of such include subscription to newsletters where one supplies their email address to a newsletter service without knowing the correct "FROM" address until the newsletter is actually received, and online ordering procedures that request a user email address for the purposes of sending a confirmation email but do not disclose their "FROM" email address. The preprocessor is an additional software module that is designed to reside on the same server as the other SpamKapu software. All incoming email is first processed by the SkProxy processor and then passed on to other SpamKapu software modules as warranted.

FIG. 10A illustrates the first phase of the general SkProxy process whereby in step 1001 a user uses a standard Web browser to connect to the SpamKapu server, then requests and is given a list of "Proxy" email address which do not directly disclose or identify the user's actual real email address step 1002. As an alternative, the user may also first create their own proxy email address, then enter that address into the SKT (FIG. 11A) via a Web interface. This liberates the end-user from having to obtain email addresses beforehand. These Proxy email addresses along with their characteristics are stored in a table shown in FIG. 11A. hereinafter referred to as the "SKT".

In the second phase shown in FIG. 10B the end-user gives out these Proxy email addresses step 1003 as needed to subscribe to newsletters or other situations where the "FROM:" email address is not known. When the entity that has received this proxy email address wants to send an email to the end-user, they can only send it to the proxy email address step 1004 because that is the only address they have on file. The SkProxy process is the first to receive the email in Step 1005.

Figure 10C:
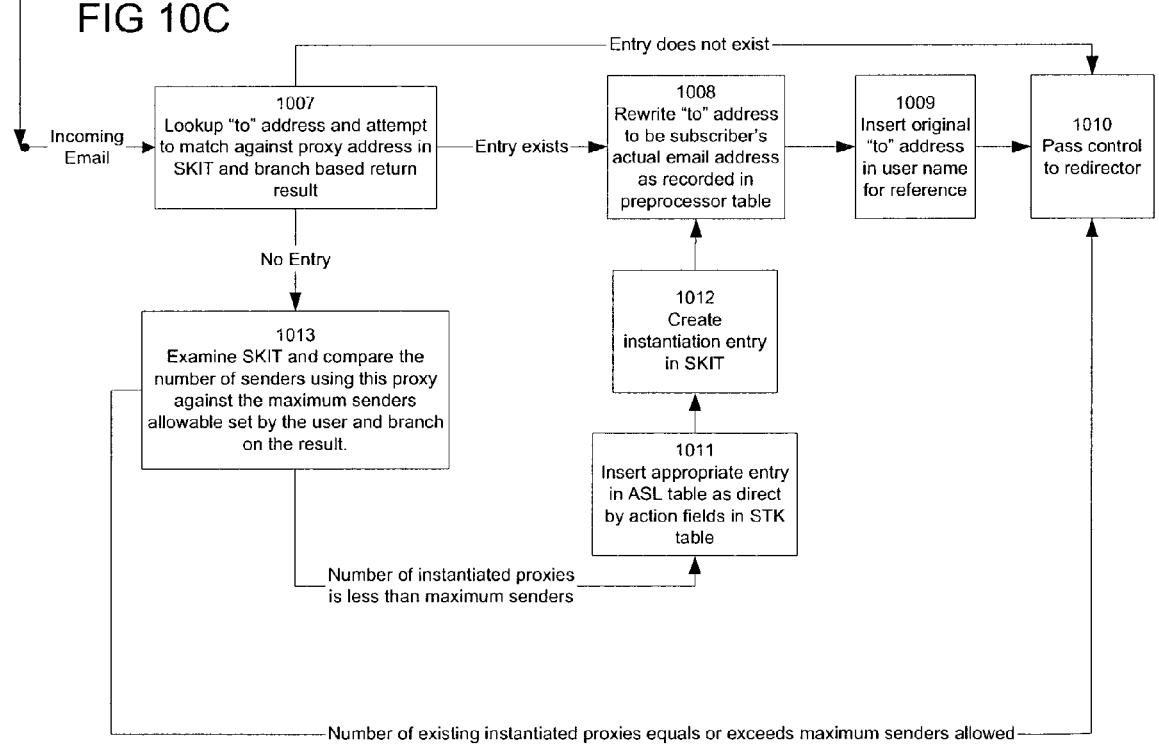

Control is then passed to FIG. 10C, step 1007, decide if the proxy address has been instantiated or not by examining the SkProxy Instantiation Table, described in FIG. 11B and hereinafter referred to as the SKIT, and use the proxy and sender addresses to find a match in the SKIT. If an entry does not exist (meaning that it has not been instantiated), then in step 1013, SkProxy counts the number of number of senders using this proxy address by examining the SKIT and determine if the number of instantiations has reached the maximum allowed as defined by the user in the SKT. If the maximum has not been reached, it instantiates the proxy address by creating an entry in the SKIT, as detailed in FIG. 12 and step 1012. In Step 1011, it references the entries in the SKT table along with the senders FROM address to create appropriate entries in the ASL Rules list as detailed in FIG. 12. In Step 1008, it rewrites and updates the "TO:" address to be the actual address of the end-user and in Step 1009 adds the proxy email address in the end-user name area so that the end-user can see what proxy email address was used by the sender. Step 1010 passes control to the Redirector which may now properly evaluate the From/To: combination and perform the correct processing. The email will now be accepted by the SpamKapu server because the instantiation process has created created appropriate ASL rules that will allow this email to pass through without requiring WBM validation.

If the maximum instantiations has been reached as determined by step 1013, SkProxy does not instantiate any further proxy entries and passes control to step 1010, returning to the Redirector. The net effect of disallowing further instantiations will be that no ASL rules will be entered and since it is highly likely that no ASL rules already exist with this sender's email address, the sender's email will most likely be rejected by the Redirector.

FIG. 11A illustrates a sample representation of the SkProxy Table ("SKT") used to hold SkProxy-related information. This table's function is to record all the proxy addresses available along with various characteristics that direct what kind of ASL entries the proxy address will create upon instantation. The following describes each field:

| Label in FIG. 11A | Column Description |
| --- | --- |
| a | Proxyaddress: the email address that can be given out by the end-user. Senders sending email to this address will reach the end-user if the proper conditions are met. |
| b | true email: the real email address of the SpamKapu end-user |
| c | creation date: the date this proxy address was created |
| d | expiration type: Relative or Absolute. A relative expiration will expire this proxy based on the number of dates elapsed from the date of a specific proxy address instantiation. An absolute expiration will expire this proxy based on the number of dates |

-continued

| Label in FIG. 11A | Column Description |
|---|---|
| | elapsed from the date of initial proxy address creation. |
| e | expiration days: the amount of days to allow to transpire. Used in conjunction with field d above to decide if a proxy address has expired. |
| f | max senders: the maximum amount of different senders that may instantiate use this proxy address. |
| g | proxy type: whether to create an ASL entry to allow the entire domain of the sender, or onl the specific email address of the sender |

The following explains the sample data presented in FIG. 11A and describes their application in the SkProxy technology:

| Row | Example and description of use |
|---|---|
| 1 | The end-user will give it out to a person at a meeting with the intent of allowing anyone from that company to send email to the subscriber. When the first email comes from that person, the skProxy process will instantiate this entry, and make an entry in the ASL table to allow for any emails from this domain to pass through as "friend". The maximum senders allowable is set to 1, so the sender's domain will be the first and the only allowable domain (company) to use this proxy |
| 2 | End-user has given this proxy address to subscribe to a newsletter and has defined the proxy to allow 2 different senders to use the proxy email address. |
| 3 | End-user is creating a private mail network to execute a small project. Because the expiration was absolute, this proxy will expire 720 days after Dec. 27, 2002. Up to 5 senders may use the same proxy address. |
| 4 | The end-user will be providing his/her email address at a corporate Web site. When the first email comes from that site, the skProxy process will instantiate this entry, and make an entry in the ASL table to allow for any emails from that specific sender only to pass through as a "friend". Because max senders is set to 1, the first sender to instantiate the address will also be the only sender that can use that proxy address. |
| 5 | End-user has given this proxy address to subscribe to a newsletter and has defined the proxy to allow 2 different domains to use the proxy email address. The expiration is set to 0 which means this proxy address will never expire. |
| 6 | End user intends to place an online order, does not want the proxy to expire, and will allow up to 3 different senders to use the same proxy address |

FIG. 11B illustrates a sample representation of the SkProxy Instantiation Table ("SKIT") used to hold specific proxy instantiation information. This table's function is to record each instantiation of the proxy address, especially the sender's email address. The following describes each field:

| Label in FIG. 11B | Column Description |
|---|---|
| a | Proxyaddress: same as FIG. 11A, column a |
| b | instantiation date: the date this proxy address was instantiated for this sender |
| c | sender id: the information to the left of the "@" sign of the sender's Internet email addresses |
| d | sender domain: the information right of the "@" sign of the sender's Internet email addresses |

The following explains the sample data presented in FIG. 1B and describes the details of various instantiations corresponding to the sample data provided in FIG. 11A:

| Row | Corresponding row in FIG. 11A | Description |
|---|---|---|
| 1 | 1 | The sender tom@acme.com sent an email to the proxy address justforacme@spamkapu.com. This row was instantiated as a result and subsequently Tom's email went through to the end-user without requiring the WBM validation. Because the column f in the corresponding row in FIG. 11A for this proxy address shows a limit of 1 sender only Tom can send email to justforacme@spamkapu.com. Anyone else sending an email to justforacme@spamkapu.com will receive an industry-standard "no such user" error message. |
| 2 | 2 | The proxy address "financialtimes@spamkapu.com" was given out by the end-user to subscribe to a newsletter. This newsletter service sends out a confirming email before starting the subscription. This row's instantiation is the result of receiving a confirming email from the newsletter service with a "FROM" address of "confirm@subscribers.com", which passed through to the end-user without requiring WBM validation. |
| 3 | 2 | This row's instantiation is the result of receiving the actual newsletter. A second email from the newsletter service with a "FROM" address of "newsletters@subscribers.com", which passed through to the end-user without requiring WBM validation. Subsequent newsletters have the same "FROM" address and therefore do not create additional instantiation records and also pass through without WBM validation. Because the max senders field in column f of the corresponding row in FIG. 11A is set to 2 and because there are 2 entries in this table, any other email sent to the proxy address "financialtimes@spamkapu.com", will not be instantiated in the SKIT table, no ASL rules will be created, and as a result the SpamKapu server will return an industry standard "no such user" error message. |
| 4 | 3 | Rows 4, 5, and 6 illustrate 3 different senders that are using the same proxy address. Emails from these senders will pass through without a WBM process. Because the corresponding entry in the SKT table shown in FIG 11A, row 3 column f, indicates that there are 5 max senders allowed, and there are only 3 different senders in this table, 2 more different senders may send an email to 9874351@spamkapu.com without requiring WBM validation. After the 2 additional instantiations have occurred, however, any other senders using the 9874351@spamkapu.com email address will receive an industry-standard "no such user" error message because no additional entries in the ASL table will be made. |
| 5 | 3 | See description for FIG. 11B Row 4 above. |
| 6 | 3 | See description for FIG. 11B Row 4 above. |
| 7 | 4 | The Web site that received a communication from the end-user has replied by sending an email FROM sales@yourshoes.com TO: 456789@spamkapu.com. This row is the resulting instantiation. Because column f in the corresponding row in FIG. 11A shows a max sender of 1, any other sender that attempts to send an email to 456789@spamkapu.com will receive an industry-standard "no such user" error message. |
| none | 5 | Note that there is an entry in FIG. 11A but there is no corresponding entry in FIG. 11 B. This is because no sender has sent an email to the proxy address in column a of the corresponding row in FIG. 11A. |
| none | 6 | Note that there is an entry in FIG. 11A but there is no corresponding entry in FIG. 11B. This is because no sender has sent an email to the proxy |

-continued

| Row | Corresponding row in FIG. 11A | Description |
|---|---|---|
| | | address in column a of the corresponding row in FIG. 11A. |

Figure 12:
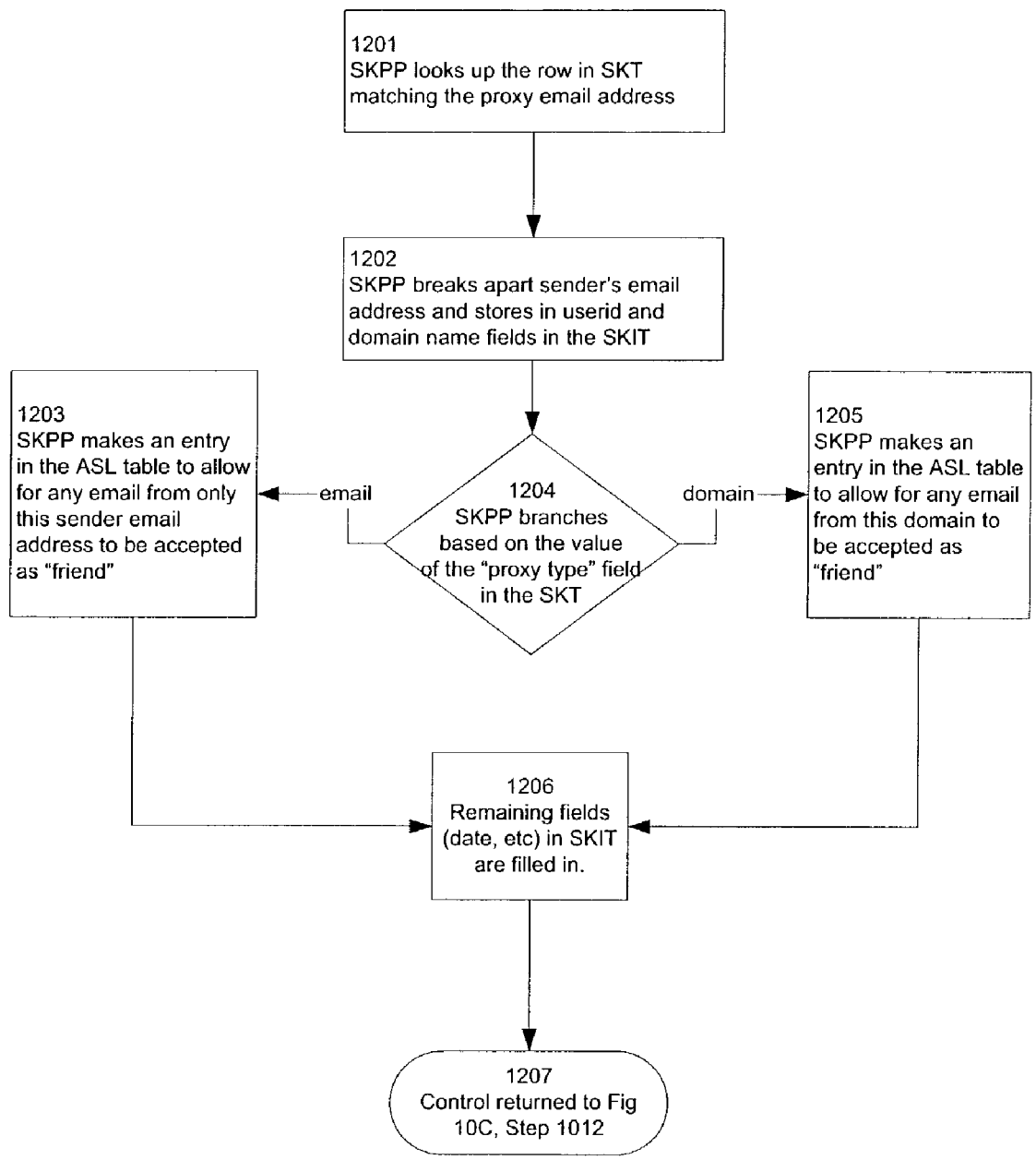
FIG. 12 illustrates a detailed implementation of how the email proxy processing subsystem converts or instantiates incoming email addresses that have not been previously received.

FIG. 12 provides a detailed description of the instantiation process. "SKPP" is defined to mean "SkProxy PreProcessor". In Step 1201 the SKPP searches for and matches the proxy email address (in the "TO:" field) in the SKT shown in FIG. 11A. Step 1202 extracts the sender's email address in to two parts, the "userid", represented by the information to the left of the "@" symbol in an Internet standard email address, and the domain, represented by the information to the right of the "@" symbol in an Internet standard email address. Step 1204 determines if the proxy is for an entire domain or for only a specific user email address. Step 1205 adds an entry in the ASL table to allow this and any further emails from this entire domain to be identified as "FRIEND" without further validation. An entire domain proxy would be useful if a user wanted the proxy email to be used by anyone within that domain; examples might include online orders or newsletters where it is acceptable to receive email from any address within that domain such as order-confirmation@amazon, order-status@amazon.com, order-support@amazon.com. Step 1203 adds an entry in the ASL table to allow this and any further emails from this specific email address only to be identified as "FRIEND" without further validation. A specific user address proxy may be useful if one wishes gives out an email address to a specific individual without forcing that individual to go through a validation process. In Step 1206, an entry is made in the SKIT table shown in FIG. 11B and all the fields are filled. Step 1207 returns control to Step 1012 in FIG. 10C and the proxy processing process continues.

Once a proxy email address has been instantiated, it can only be used for the specific FROM domain or email address that it was instantiated for. For example, if an end-user submitted their domain-wide proxy email address for the purpose of an online order, and that email address was subsequently instantiated, the proxy email address cannot be successfully used by a sender that does not use the same domain name as the online order vendor.

By defining the maximum amount of senders that may use a given proxy address, the end-user can effectively create "private email networks" whereby the proxy email address will work for collection of individuals or organizations but does not work for others.

Figure 13A:
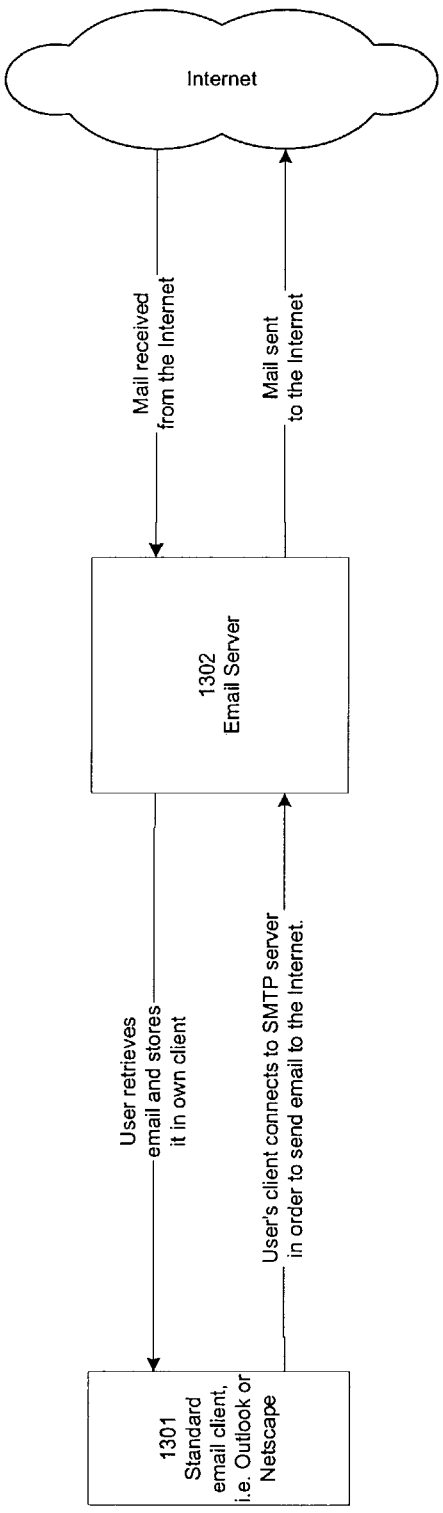
FIGS. 13A to 13F are schematic diagrams illustrating how the invention in its preferred embodiment would be installed/configured in existing email server architectures.

Existing standard email configurations as shown in FIG. 13A use an email server 1302 to receive email, store email in an inbox to be retrieved by client computer, and to transmit email sent by the client computer 1301. The improvement in this invention as shown in FIG. 13B allows a SpamKapu server to be easily installed in an existing email network as a hardware network appliance device with minimal reconfiguration of the existing network and/or additional maintenance labor from staff.

Figure 13B:
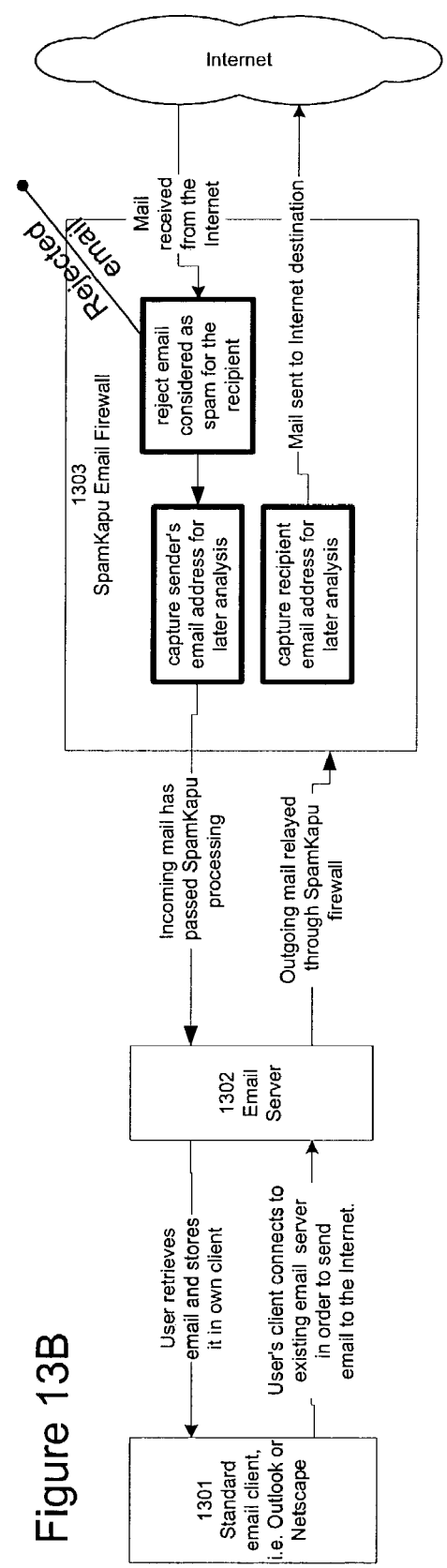

FIG. 13B illustrates how the invention would be installed so that any incoming email would first pass through the processing of the SpamKapu server. Only validated FRIEND email would pass through to the (previously) existing email server 1302. All existing configuration and processing on that existing email server would continue unchanged. Outgoing email would go from the client computer 1301 to the existing email server 1302 which in-turn will use industry-standard relay specifications to pass its email to the SpamKapu server 1303 which would copy all recipient email addresses to its ASL Rules List as "FRIENDS", then send the email to its intended destination server and recipient. This configuration provides a simple and transparent method to both block all incoming spam and easily copy the outgoing emailing addresses into the ASL Rules List.

Figure 13C:
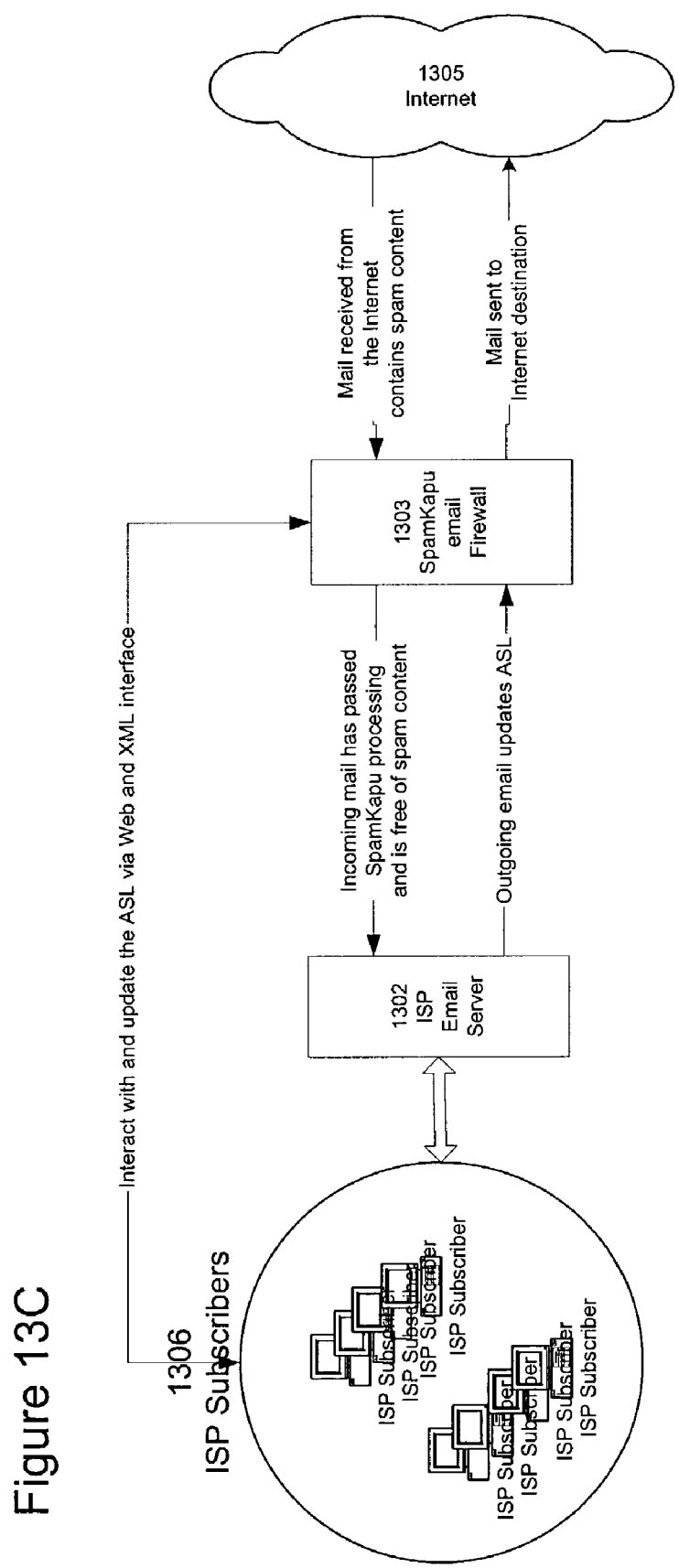

FIG. 13C illustrates how the invention can be installed at an ISP facility to provide spam protection to the subscriber base. The spamKapu email firewall 1303 is installed to process mail addressed to subscriber accounts 1306. Subscribers interact with the SpamKapu email firewall 1303 via the provided Web interfaces and XML interfaces (see FIG. 8). In this configuration, spam protection can be provided to an ISP subscriber base.

Figure 13D:
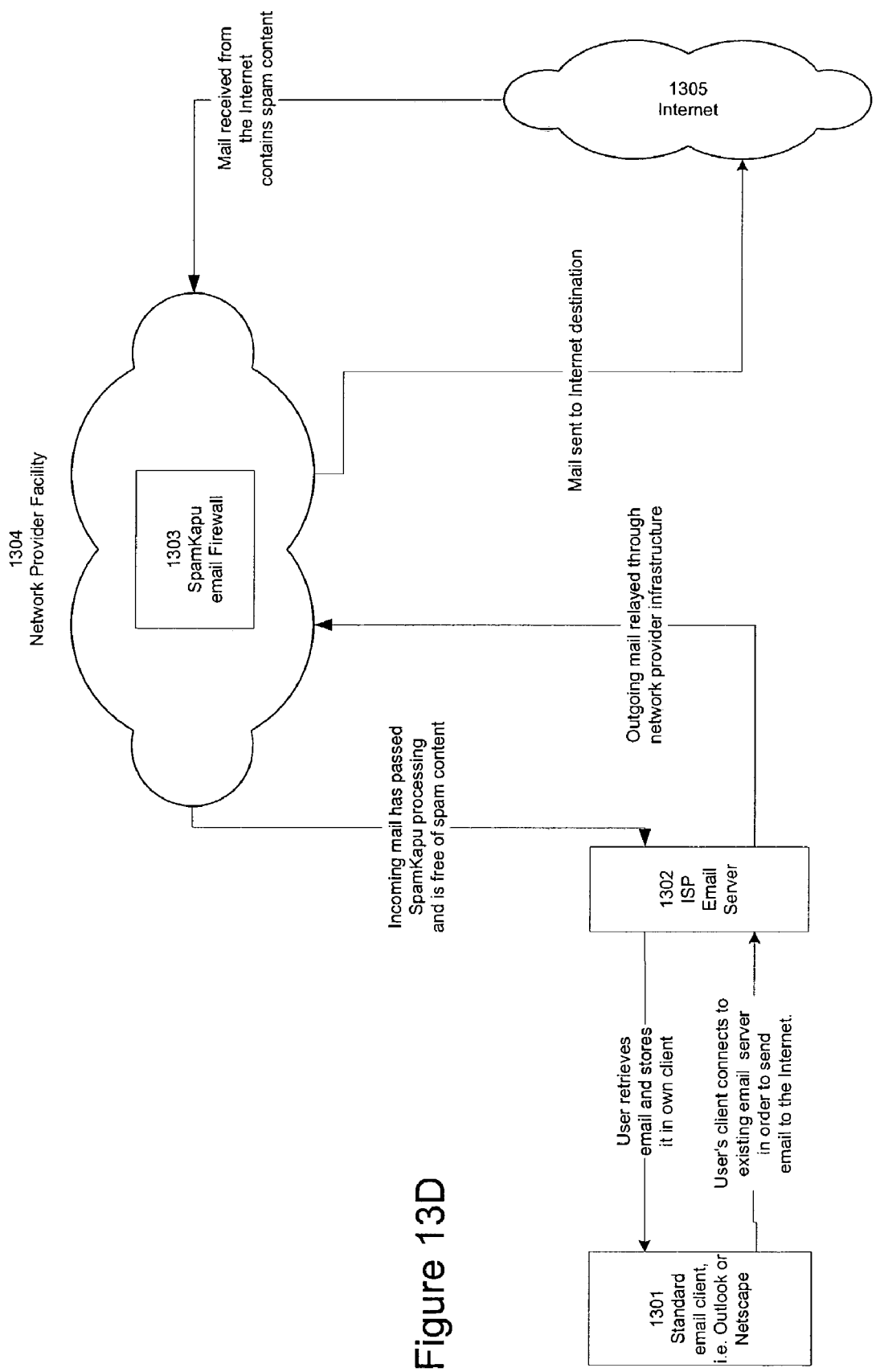

FIG. 13D illustrates how the invention can be installed at a network connectivity provider's facility to effectively offload spam-related email bandwidth for ISPs or corporate installations. All incoming email from the Internet 1305 is sent to the network provider facility 1304 that typically has significant bandwidth capability. All spam-related email is rejected by the SpamKapu email firewall 1303 as described previously. The remaining spam-free email 1307 then passed to the ISP or corporate email server 1302. The end results is the effective reduction of bandwidth used to simply transmit spam.

Figure 13E:
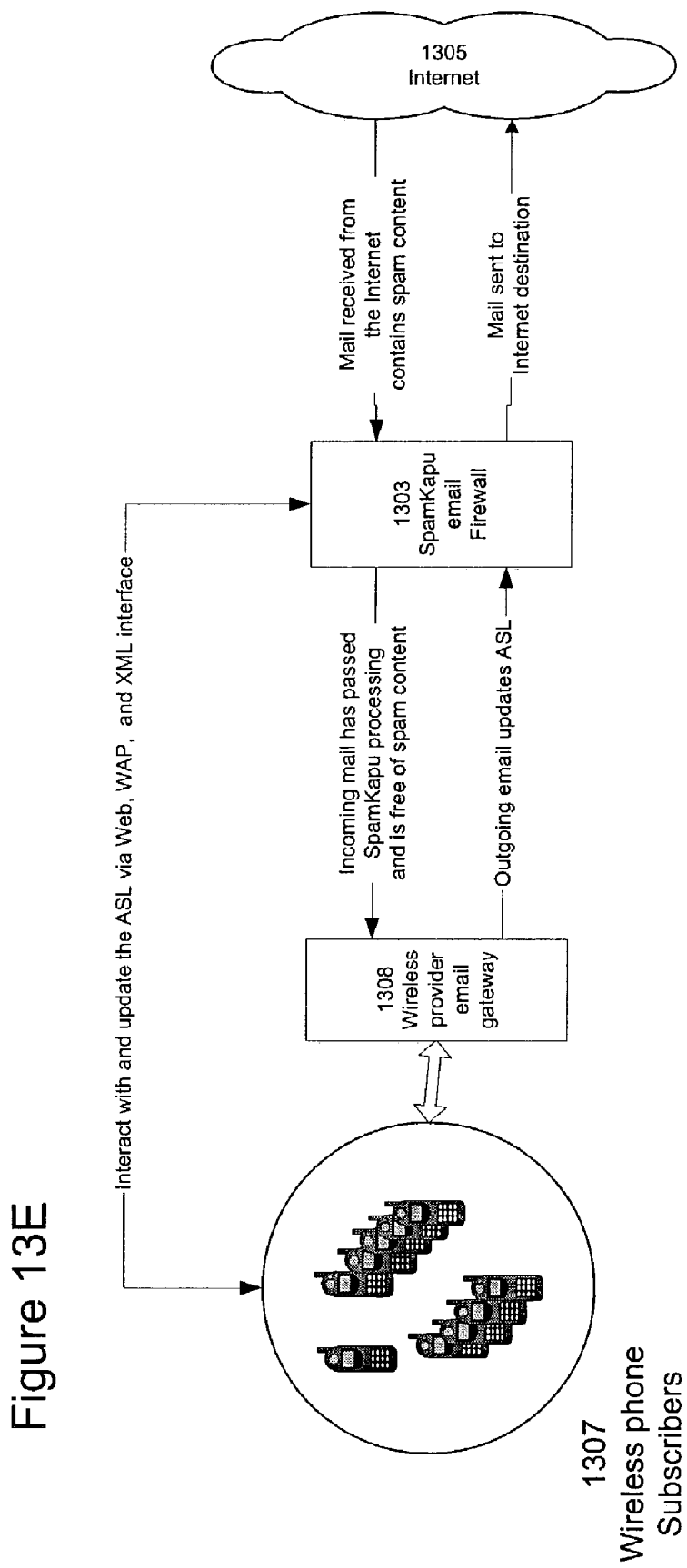

FIG. 13E illustrates how the invention can be installed at a wireless telephone service provider facility to provide spam protection for wireless subscribers. Most carriers provide an Internet email gateway 1308 whereby wireless subscribers can send and receive Internet email. The spamKapu email firewall 1303 is installed to process mail addressed to subscriber accounts 1307. Subscribers interact with the SpamKapu email firewall 1303 via the provided Web interfaces and XML interfaces (see FIG. 8). To provide added functionality for wireless phone subscribers, an additional communication layer that follows the WAP (wireless access protocol) is illustrated to allow subscribers to interact with the SpamKapu firewall using only their wireless device. In this configuration, spam protection can be provided an wireless subscriber base.

The firewall configuration is not intended to replace any existing firewall devices operating on the network. For network configuration purposes, the SpamKapu email firewall replaces the existing email server that processes external incoming email and transmits email addressed to external servers. The ideal configuration of the SpamKapu firewall is to be considered a hardware component alongside the existing email servers and in conjunction with any other existing firewall devices.

The optimal commercialization of the SpamKapu server will be as a network appliance. This can be packaged as a complete hardware and software solution or the software can be installed on dedicated hardware by knowledgeable technicians. The key envisioned commercial applications include A) Commercial ISPs that use the SpamKapu technology to provide spam elimination services to their clients. B) Network providers that offer both spam elimination and reduced bandwidth usage.

Figure 13F:
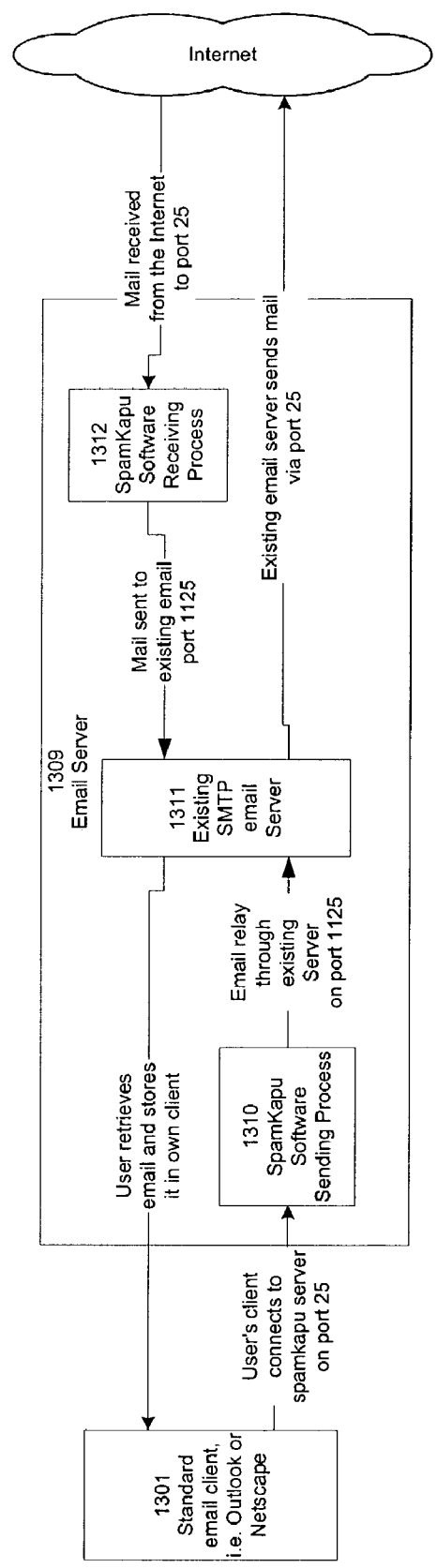

FIG. 13F illustrates how SpamKapu can be installed on an existing email server 1311 in a pure software configuration. The established Internet email standard protocol uses TCP/IP port 25 to send and receive email. By reconfiguring the existing email server 1311 to look for incoming email on another port, for example 1125, and transmit email on port 25 and configuring SpamKapu software 1312 to look for incoming mail on port 25 and send its mail through port 1125, the SpamKapu server is properly inserted into the email transmit and receive process. In the case of incoming email, it is first routed through SpamKapu's receive process in step 1312 via port 25 and then is sent to the existing email server via port 1125 where the user client 1301 can retrieve the email. In the case of outgoing mail, the client connects to SpamKapu's transmit process via port 25 which performs processing as detailed in FIG. 3b, and is then sent via port 1125 to the existing email server 1311 which in-turn sends the email to its destination over the Internet via port 25. The configuration illustrated in FIG. 13F allows the SpamKapu invention to be installed on existing server hardware thereby lowering the overall cost and maintenance involved with additional hardware.

In summary, the present invention provides a spam email rejection method which analyzes the sender address of incoming email and determines whether it is to be rejected before being accepted by an email-receiving server by returning a standard "no such user" error code or redirecting it elsewhere. This provides an advantage over existing anti-spam filtering systems which accept all email and attempts to filter out only those that have sender addresses recognized as those of known spammers. The invention employs an ASL module to capture authorized sender email addresses from the user's outgoing email or other sources in order to update the "authorized senders" (ASL) lists. The WBM procedure allows senders of rejected email to go to a separate website and register as valid senders after passing an interaction test that confirms that it is not being done by a mechanical program. The SkProxy procedure allows subscribers to use temporary proxy addresses for receiving email expected from unknown sources and instantiates senders as authorized upon receiving the expected email to the proxy addresses. The unauthorized-email rejection component of the system can be readily configured as a hardware or software appliance used in tandem with a conventional email server, email gateway, or firewall to an intranet, or as a software extension to an existing firewall system.

It is understood that many other modifications and variations may be devised given the above description of the guiding principles of the invention. It is intended that all such modifications and variations be considered as within the spirit and scope of this invention, as defined in the following claims.

I claim:

1. A system, comprising:
one or more hardware processors and one or more computer memories together providing:
   (a) an email client for allowing receipt of email sent on a network addressed to a primary email address;
   (b) an email-receiving server for connection between the network and the email client for receiving email addressed to the primary email address;
   (c) an unauthorized-email rejection component having an authorized senders list (ASL) module to maintain email addresses authorized to send email to the primary email address, wherein the unauthorized-email rejection component is for operation with the email-receiving server for intercepting and rejecting any email addressed to the primary email address received from an email address not on the authorized senders list; and
   (d) an email proxy pre-processing module that allows designation of a proxy email address that is associated with the primary email address but distinct from the primary email address to receive email from email addresses not on the authorized senders list,
wherein, upon receiving incoming email addressed to the proxy email address from an email address not on the authorized senders list, the unauthorized-email rejection component accepts the email and adds the email address from which the incoming email was received to the authorized senders list,
wherein said email proxy pre-processing module includes a control parameter to limit usage of the proxy address and terminate acceptance of email sent to the proxy address from email addresses not on the authorized senders list and prevent addition to the authorized senders list, whereby said unauthorized-email rejection component thereafter rejects email from a different unknown email addresses and prevents the different unknown email address from being added to the authorized senders list.

2. The system according to claim 1, wherein the unauthorized-email rejection component is adapted to be positioned in the flow of incoming email upstream from the email-receiving server such as to intercept unauthorized email and such as to prevent unauthorized email from reaching the email-receiving server.

3. The system according to claim 1, wherein the unauthorized-email rejection component is configured as a hardware appliance for positioning in the flow of incoming email physically upstream from the email-receiving server.

4. The system according to claim 1, wherein the unauthorized-email rejection component is configured as a software component for operation in the flow of incoming email logically upstream of the email-receiving server.

5. The system according to claim 1, further comprising a WBM component to send a message to an email address from which rejected email is received inviting to validate the email address from which rejected email is received as an authorized sending email address.

6. The system according to claim 5, wherein the WBM component is adapted to specify a predetermined time period for the email address from which rejected email is received to be validated as an authorized sending email address.

7. The system according to claim 5, wherein the WBM component is adapted to require an interaction procedure to be passed to show that a mechanical program is not seeking to automatically validate the email address from which rejected email is received.

8. The system according to claim 7, wherein the interaction procedure includes a display of a graphic image of a word or object, and an input to enter in a text word in response to the graphic image, whereby the system can confirm that the interaction procedure is not being performed by a mechanical program.

9. The system according to claim 1, wherein said unauthorized-email rejection component is adapted to, upon the ASL module determining that incoming email is received from an email address that is not on the authorized senders list, reject the incoming email with an industry standard "no such user" error message.

10. The system according to claim 1, wherein, when the email proxy pre-processing module receives incoming email addressed to the proxy email address from an email address not on the authorized senders list, the unauthorized-email rejection component is configured to add to the authorized senders list an entry indicating all email addresses of the same domain as the email address from which the incoming email is received.

11. The system according to claim 1, wherein the control parameter is a maximum number of different email addresses from which email sent to the proxy address will be accepted.

12. The system according to claim 1, wherein the control parameter is a maximum period of time after the most recent email from an email addresses not on the authorized senders list was accepted that the next email from an email addresses not on the authorized senders list may be accepted.

13. A method, comprising:
(a) receiving incoming email addressed to a primary email address;
(b) maintaining an authorized senders list (ASL list) of external email addresses authorized to send email to the user;
(c) processing a sender email address on incoming email by comparing it to the ASL list;
(d) unconditionally rejecting the receipt of incoming email before the email can be accepted for delivery if the results of processing the ASL list returns with a result of "unauthorized sender";
(e) enabling designation of a proxy email address that is associated with the primary email address but distinct from the primary email address to receive email from email addresses not on the authorized senders list, and upon receiving incoming email addressed to the proxy email address of the user from an email address not on the authorized senders list, accepting the email and adding the email address from which the incoming email was received to the authorized senders list; and
(f) further enabling presetting of a control parameter for limiting usage of the proxy address and terminating acceptance of email sent to the proxy address from email addresses not on the authorized senders list and preventing addition to the authorized senders list, and thereafter not accepting email from a different unknown email address nor adding the different unknown email address to the authorized senders list.

14. The method according to claim 13, wherein said unauthorized-email rejection processes the incoming email using the destination proxy address according to rules that permit only email from a predefined quantity of any email addresses or domains to be accepted without requiring WBM validation.

15. The method according to claim 13, further comprising, upon receiving incoming email addressed to the proxy email address from an email address not on the authorized senders list, adding to the authorized senders list an entry indicating all email addresses of the same domain as the email address from which the incoming email is received.

16. The method according to claim 13, wherein the control parameter is a maximum number of different email addresses not on the authorized senders list from which email sent to the proxy address will be accepted.

17. The method according to claim 13, wherein the control parameter is a maximum period of time after the most recent email from an email addresses not on the authorized senders list was accepted that the next email from an email addresses not on the authorized senders list may be accepted.

18. An unauthorized-email rejection system, comprising:
one or more hardware processors and one or more computer memories together providing,
(a) an unauthorized-email rejection component having an authorized senders list (ASL) module to maintain email addresses authorized to send email to a primary email address, wherein the unauthorized-email rejection component is operable with the email-receiving server to intercept and reject any email addressed to the primary email address received from an email address not on the authorized senders list; and
(b) an email proxy pre-processing module that allows designation of a proxy email address that is associated with the primary email address but distinct from the primary email address to receive email from email addresses not on the authorized senders list, and upon receiving incoming email addressed to the proxy email address from an email address not on the authorized senders list, the unauthorized-email rejection component to accept the email and to add the email address from which the primary email was received to the authorized senders list, wherein said email proxy pre-processing module includes a control for enabling pre-setting of a control parameter for limiting usage of the proxy address and terminating acceptance of email sent to the proxy address from email addresses not on the authorized senders list and to not allow addition to the authorized senders list, said unauthorized-email rejection component thereafter to not accept email from a different email addresses not on the authorized senders list and to not add the different email address to the authorized senders list.

19. The unauthorized-email rejection system according to claim 18, wherein, when the email proxy pre-processing module receives incoming email addressed to the proxy email address from an email address not on the authorized senders list, the unauthorized-email rejection component is configured to add to the authorized senders list an entry indicating all email addresses of the same domain as the email address from which the incoming email is received.

20. The unauthorized-email rejection system according to claim 18, wherein the control parameter is a maximum number of different email addresses not on the authorized senders list from which email sent to the proxy address will be accepted.

21. The unauthorized-email rejection system according to claim 18, wherein the control parameter is a maximum period of time after the most recent email from an email addresses not on the authorized senders list was accepted that the next email from an email addresses not on the authorized senders list may be accepted.

22. A physical computer-readable storage medium having instructions stored thereon, the instructions comprising:
(a) instructions to receive incoming messages addressed to a primary address;
(b) instructions to maintain an authorized senders list (ASL list) of sender addresses authorized to send messages to the user;
(c) instructions to process a sender address on an incoming message by comparing it to the ASL list;
(d) instructions to unconditionally reject the receipt of the incoming message before the message can be accepted for delivery if the results of processing the ASL list returns with a result of "unauthorized sender";
(e) instructions to enable designation of a proxy address that is associated with the primary address but distinct from the primary address to receive messages from sender addresses not on the authorized senders list, and upon receiving incoming messages addressed to the proxy address of the user from a sender address not on the authorized senders list, accepting the message and adding the sender address from which the incoming message was received to the authorized senders list; and
(f) instructions to further enable presetting of a control parameter for limiting usage of the proxy address and terminating acceptance of messages sent to the proxy address from sender addresses not on the authorized senders list and preventing addition to the authorized senders list, and thereafter not accepting messages from a different unknown sender address nor adding the different unknown sender address to the authorized senders list.

23. The computer-readable storage medium of claim 22, further comprising instructions to, upon receiving an incoming message addressed to the proxy address from a sender address not on the authorized senders list, add to the authorized senders list an entry indicating all sender addresses of the same domain as the sender address from which the incoming message is received.

24. The computer-readable storage medium of claim 22, wherein the control parameter is a maximum number of different sender addresses not on the authorized senders list from which messages sent to the proxy address will be accepted.

25. The computer-readable storage medium of claim 22, wherein the control parameter is a maximum period of time after the most recent message from a sender address not on the authorized senders list was accepted that the next message from another sender address not on the authorized senders list may be accepted.

26. A system comprising:
- (a) means for receiving incoming messages addressed to a primary address of a user;
- (b) means for maintaining an authorized senders list (ASL list) of sender addresses authorized to send messages to the user;
- (c) means for processing a sender address on an incoming message by comparing it to the ASL list;
- (d) means for unconditionally rejecting the receipt of the incoming message before the message can be accepted for delivery if the results of processing the ASL list returns with a result of "unauthorized sender";
- (e) means for enabling designation of a proxy address that is associated with the primary address but distinct from the primary address to receive messages from sender addresses not on the authorized senders list, and upon receiving an incoming message addressed to the proxy address of the user from a sender address not on the authorized senders list, accepting the message and adding the sender address from which the incoming message was received to the authorized senders list; and
- (f) means for further enabling presetting of a control parameter for limiting usage of the proxy address and terminating acceptance of messages sent to the proxy address from sender addresses not on the authorized senders list and preventing addition to the authorized senders list, and thereafter not accepting messages from a different unknown sender address nor adding the different unknown sender address to the authorized senders list.

27. The system of claim 26, further comprising means for, upon receiving an incoming message addressed to the proxy address from a sender address not on the authorized senders list, adding to the authorized senders list an entry indicating all sender addresses of the same domain as the sender address from which the incoming message is received.

28. The system of claim 26, wherein the control parameter is a maximum number of different sender addresses not on the authorized senders list from which messages sent to the proxy address will be accepted.

29. The system of claim 26, wherein the control parameter is a maximum period of time after the most recent message from a sender address not on the authorized senders list was accepted that the next message from a sender address not on the authorized senders list may be accepted.

* * * * *